United States Patent
Duan et al.

(10) Patent No.: US 7,986,612 B2
(45) Date of Patent: Jul. 26, 2011

(54) COMMUNICATION TERMINAL APPARATUS, BASE STATION APPARATUS AND RECEPTION QUALITY REPORTING METHOD

(75) Inventors: Jinsong Duan, Kadoma (JP); Atsushi Sumasu, Kadoma (JP)

(73) Assignee: Panasonic Corporation, Osaka (JP)

( * ) Notice: Subject to any disclaimer, the term of this patent is extended or adjusted under 35 U.S.C. 154(b) by 84 days.

(21) Appl. No.: 12/064,610

(22) PCT Filed: Aug. 22, 2005

(86) PCT No.: PCT/JP2005/015198
§ 371 (c)(1),
(2), (4) Date: Feb. 22, 2008

(87) PCT Pub. No.: WO2007/023515
PCT Pub. Date: Mar. 1, 2007

(65) Prior Publication Data
US 2009/0147869 A1 Jun. 11, 2009

(51) Int. Cl.
*H04J 11/00* (2006.01)
(52) U.S. Cl. ........ 370/206; 370/332; 370/485; 370/261; 370/298; 455/45
(58) Field of Classification Search .................. 370/252, 370/295, 310.2, 328, 332, 480, 485, 206; 375/260, 261, 298, 326, 339; 455/45, 517, 455/59, 63.3, 68, 226.3, 229, 230, 67.7, 69
See application file for complete search history.

(56) References Cited

U.S. PATENT DOCUMENTS

| | | | | |
|---|---|---|---|---|
| 7,012,912 B2* | 3/2006 | Naguib et al. | ................. | 370/343 |
| 7,330,700 B2* | 2/2008 | Aizawa | ....................... | 455/67.13 |
| 7,542,504 B2* | 6/2009 | Chang et al. | .................. | 375/132 |
| 7,545,772 B2* | 6/2009 | Hwang et al. | ................. | 370/329 |
| 7,567,625 B2* | 7/2009 | Oh et al. | ........................ | 375/299 |
| 7,570,953 B2* | 8/2009 | Maltsev et al. | ............... | 455/450 |
| 7,602,872 B2* | 10/2009 | Suh et al. | ....................... | 375/357 |
| 7,613,244 B2* | 11/2009 | Hwang et al. | ................. | 375/260 |
| 7,626,919 B2* | 12/2009 | Miyoshi et al. | ............... | 370/208 |
| 2002/0155861 A1* | 10/2002 | Sumasu et al. | ............... | 455/561 |
| 2003/0203721 A1* | 10/2003 | Berezdivin et al. | ........... | 455/126 |
| 2004/0125743 A1* | 7/2004 | Hashem et al. | ............... | 370/208 |
| 2004/0228283 A1* | 11/2004 | Naguib et al. | ................ | 370/252 |

(Continued)

FOREIGN PATENT DOCUMENTS
JP 2001-351971 A 12/2001
(Continued)

*Primary Examiner* — Aung S Moe
*Assistant Examiner* — Benjamin Elliott
(74) *Attorney, Agent, or Firm* — Dickinson Wright PLLC

(57) ABSTRACT

A communication terminal apparatus that can eliminate the waste of reception quality report, suppress the interference of an upstream network, perform an optimum assignment using a scheduling, prevent the loss of resources, and ensure the fairness of transmission assignment using the scheduling. In this apparatus, a reception quality determining part (110) uses a pilot signal, which is included in a received signal, to determine the reception quality for each of subcarrier blocks. A CQI generating part (111) generates CQIs each of which is the information indicative of a result of the determination by the reception quality determining part (110). A sorting part (112) sorts the CQIs in descending or ascending order of the reception quality. A control part (113) instructs, based on information about the number of subcarrier blocks in which the CQIs have been transmitted, collision information and scheduling information, the sorting part (112) with respect to the number of subcarrier blocks in which the CQIs are outputted.

2 Claims, 17 Drawing Sheets

U.S. PATENT DOCUMENTS

| | | | |
|---|---|---|---|
| 2004/0228417 A1* | 11/2004 | Kennedy et al. | 375/260 |
| 2005/0128993 A1* | 6/2005 | Yu et al. | 370/342 |
| 2005/0191965 A1* | 9/2005 | Yu et al. | 455/67.16 |
| 2005/0201474 A1* | 9/2005 | Cho et al. | 375/260 |
| 2006/0089102 A1* | 4/2006 | Nishio et al. | 455/67.11 |
| 2006/0160498 A1* | 7/2006 | Sudo | 455/103 |
| 2006/0221883 A1* | 10/2006 | Damnjanovic et al. | 370/315 |
| 2009/0147869 A1* | 6/2009 | Duan et al. | 375/260 |

FOREIGN PATENT DOCUMENTS

| | | |
|---|---|---|
| JP | 2003-152671 A | 5/2003 |
| JP | 2003-288162 A | 10/2003 |
| JP | 2004-208234 A | 7/2004 |
| JP | 2005-160079 A | 6/2005 |

\* cited by examiner

| (A) THE NUMBER OF REPORTS OR REPORT TIME NUMBER | (B) THE NUMBER OF REPORT SCBS DESIGNATED FROM Node B | (C) THE NUMBER OF REPORTED SCBS | (D) THE NUMBER OF ACTUALLY ALLOCATED SCBS | (E) INSTANTANEOUS ALLOCATION RATE | (F) CUMULATIVE ALLOCATION RATE |
|---|---|---|---|---|---|
| 1 | 1 | 1 | 0 | 0 | 0 |
| 2 | 1 | 2 | 0 | 0 | 0 |
| 3 | 1 | 3 | 1 | 1 | 1/3 |
| 4 | 1 | 2 | 1 | 1 | 1/2 |
| 5 | 1 | 2 | 1 | 1 | 3/5 |
| 6 | 1 | 1 | 0 | 0 | 3/6 |
| 7 | 1 | 2 | 0 | 0 | 3/7 |
| 8 | 1 | 2 | 1 | 1 | 1/2 |
| 9 | 1 | 3 | 1 | 1 | 5/9 |
| 10 | 1 | 3 | 0 | 0 | 1/2 |
| 11 | 1 | 2 | 0 | 0 | 5/11 |
| 12 | 1 | 2 | 1 | 1 | 1/2 |
| 13 | 1 | 3 | 1 | 1 | 7/13 |
| 14 | 1 | 3 | 0 | 0 | 1/2 |
| 15 | 1 | 4 | 0 | 0 | 7/15 |
| 16 | 1 | 4 | 1 | 1 | 1/2 |

FIG.14

| (A) REPORT TIME | (B) REPORT SUBCARRIER BLOCK NUMBER | (C) THE NUMBER OF CQI REPORTS | (D) COLLISION FACTOR OF SUBCARRIER BLOCK | (E) DISTRIBUTION OF UE REPORTS | (F) THE NUMBER OF ALL UES | (G) UE BASED CUMULATIVE/ INSTANTANEOUS ALLOCATION RATE | (H) UE BASED DESIRED/ ACTUAL BIT RATE | (I) UE BASED REPORT FREQUENCY RANGE |
|---|---|---|---|---|---|---|---|---|
| 1 | 1 | 3 | 3 | UE1, 3, 8 | 16 | x,x,...,x | x,x,...,x | x,x,...,x |
| 1 | 2 | 6 | 6 | x,x,...,x | 16 | x,x,...,x | x,x,...,x | x,x,...,x |
| 1 | 3 | 8 | 8 | x,x,...,x | 16 | x,x,...,x | x,x,...,x | x,x,...,x |
| 1 | 4 | 2 | 2 | x,x,...,x | 16 | x,x,...,x | x,x,...,x | x,x,...,x |
| 1 | 5 | 1 | 1 | x,x,...,x | 16 | x,x,...,x | x,x,...,x | x,x,...,x |
| 1 | 6 | 0 | 0 | x,x,...,x | 16 | x,x,...,x | x,x,...,x | x,x,...,x |
| 1 | 7 | 0 | 0 | x,x,...,x | 16 | x,x,...,x | x,x,...,x | x,x,...,x |
| 1 | 8 | 3 | 3 | x,x,...,x | 16 | x,x,...,x | x,x,...,x | x,x,...,x |
| 2 | 1 | 2 | 2 | x,x,...,x | 16 | x,x,...,x | x,x,...,x | x,x,...,x |
| 2 | 2 | 4 | 4 | x,x,...,x | 16 | x,x,...,x | x,x,...,x | x,x,...,x |
| 2 | 3 | 6 | 6 | x,x,...,x | 16 | x,x,...,x | x,x,...,x | x,x,...,x |
| 2 | 4 | 2 | 2 | x,x,...,x | 16 | x,x,...,x | x,x,...,x | x,x,...,x |
| 2 | 5 | 4 | 4 | x,x,...,x | 16 | x,x,...,x | x,x,...,x | x,x,...,x |
| 2 | 6 | 0 | 0 | x,x,...,x | 16 | x,x,...,x | x,x,...,x | x,x,...,x |
| 2 | 7 | 1 | 1 | x,x,...,x | 16 | x,x,...,x | x,x,...,x | x,x,...,x |
| 2 | 8 | 0 | 0 | x,x,...,x | 16 | x,x,...,x | x,x,...,x | x,x,...,x |

FIG.21

COMMUNICATION TERMINAL APPARATUS, BASE STATION APPARATUS AND RECEPTION QUALITY REPORTING METHOD

TECHNICAL FIELD

The present invention relates to a communication terminal apparatus, base station apparatus and received quality reporting method. More particularly, the present invention relates to a communication terminal apparatus, base station apparatus and received quality reporting method for reporting received quality in uplink in a multicarrier transmission scheme.

BACKGROUND ART

In OFDM (Orthogonal Frequency Division Multiplex) transmission, as shown in FIG. 1, there are cases where communication quality of each subcarrier block (SCB1 to SCB8) is different from one another due to frequency selective fading. Further, in downlink OFDM transmission, channel states vary for each communication terminal apparatus (UE), and so, by making each communication terminal apparatus report the received quality to the base station apparatus (Node B), the base station apparatus can select per communication terminal apparatus only subcarriers having good received quality and allocate transmission data. This method is called frequency scheduling. In general, to perform frequency scheduling, it is necessary that each communication terminal apparatus measures received quality for a known pilot signal transmitted from Node B, and reports received quality information (CQI) based on the measurement result to the base station apparatus. However, when the number of subcarriers forming an OFDM signal is large, the report amount is enormous when the received quality is reported for all subcarriers, and there is a problem that uplink wireless resources are wasted.

For the above-mentioned problem, various reporting amount reducing schemes have been proposed. For example, such a method is known that a communication terminal apparatus does not report received quality of a subcarrier with poor quality, and only reports received quality of a subcarrier with good quality (for example, Patent Document 1)

Patent Document 1: Japanese Patent Application Laid-Open No. 2001-351971

DISCLOSURE OF INVENTION

Problems to be Solved by the Invention

However, in the conventional apparatus, each communication terminal apparatus independently judges subcarriers to report received quality, and so there is a case where a plurality of communication terminal apparatuses report the received quality of the same subcarrier at the same time. In this case, the base station apparatus cannot assign a plurality of communication terminals to a single subcarrier, and therefore there are problems that reports of received quality are wasted and the interference increases in uplink. Further, there is a case where a subcarrier for which no received quality is reported exists. In this case, transmission allocation cannot be carried out based on the received quality, there are problems that optimal allocation by scheduling cannot be carried out and resources are lost. Furthermore, there is a problem that it is difficult to set a criterion for reporting the received quality from each communication terminal apparatus. For example, such a case arises where a communication terminal apparatus near the base station apparatus is generally good in received quality and reports the received quality for all subcarriers, and a communication terminal apparatus far from the base station apparatus is generally poor in received quality and does not report received quality. In this case, there is a problem that transmission allocation by scheduling cannot be performed fairly.

It is therefore an object of the present invention to provide a communication terminal apparatus, base station apparatus and received quality reporting method capable of reducing the interference in uplink without wasting reports of received quality, performing optimal allocation by scheduling, preventing resources from being lost, and maintaining fairness of transmission allocation by scheduling.

Means for Solving the Problem

A communication terminal apparatus of the present invention adopts a configuration including: a received quality measuring section that measures received quality for each subcarrier block that is a bundle of a plurality of subcarriers; a received quality information generating section that generates per subcarrier block received quality information, which is information of the received quality measured at the received quality measuring section; a transmitting section that transmits the received quality information generated in the received quality information generating section to a communicating party; and a controlling section that controls the number of subcarrier blocks for which the transmission section transmits the received quality information, based on the received quality information transmitted from the transmission section and a result of scheduling using the received quality information at the communicating party.

A base station apparatus of the present invention adopts a configuration including: a reception section that receives received quality information which is information of received quality for each subcarrier block that is a bundle of a plurality of subcarriers; a scheduling section that performs scheduling which is processing for allocating resources for each subcarrier block to a communication terminal apparatus where the received quality information received in the reception section meets predetermined quality; a control section that controls the number of subcarrier blocks for which the communication terminal apparatus transmits the received quality information, based on the received quality information and a result of the scheduling in the scheduling section; and a transmission section that transmits number-of-report-subcarrier-block information which is information of the number of subcarrier blocks controlled in the control section to the communication terminal apparatus.

A received quality reporting method of the present invention has the steps of: measuring received quality for each subcarrier block that is a bundle of a plurality of subcarriers; generating received quality information which is information of the measured received quality for each subcarrier block; transmitting the generated received quality information to a base station apparatus from a communication terminal apparatus; receiving in the base station apparatus the received quality information of a plurality of communication terminal apparatuses; performing scheduling which is processing for allocating resources per subcarrier block within predetermined resources to a communication terminal apparatus where the received quality of the received quality information meets predetermined quality; reporting the scheduling result from the base station apparatus to the communication terminal apparatuses; and controlling in the communication terminal apparatus the number of subcarrier blocks for which the received quality information is transmitted based on the received quality information transmitted to the base station apparatus from the communication terminal apparatus and the scheduling result reported from the base station apparatus.

ADVANTAGEOUS EFFECT OF THE INVENTION

According to the present invention, it is possible to reduce the interference in uplink without wasting reports of received quality, perform optimal allocation by scheduling, prevent resources from being lost, and maintain fairness of transmission allocation by scheduling.

BRIEF DESCRIPTION OF DRAWINGS

FIG. 14 shows an instantaneous allocation rate and a cumulative allocation rate according to Embodiment 3 of the present invention;

FIG. 21 shows collisions in subcarrier blocks according to Embodiment 6 of the present invention;

BEST MODE FOR CARRYING OUT THE INVENTION

Embodiments of the present invention will be described in detail below with reference to the accompanying drawings.

Embodiment 1

Figure 1:
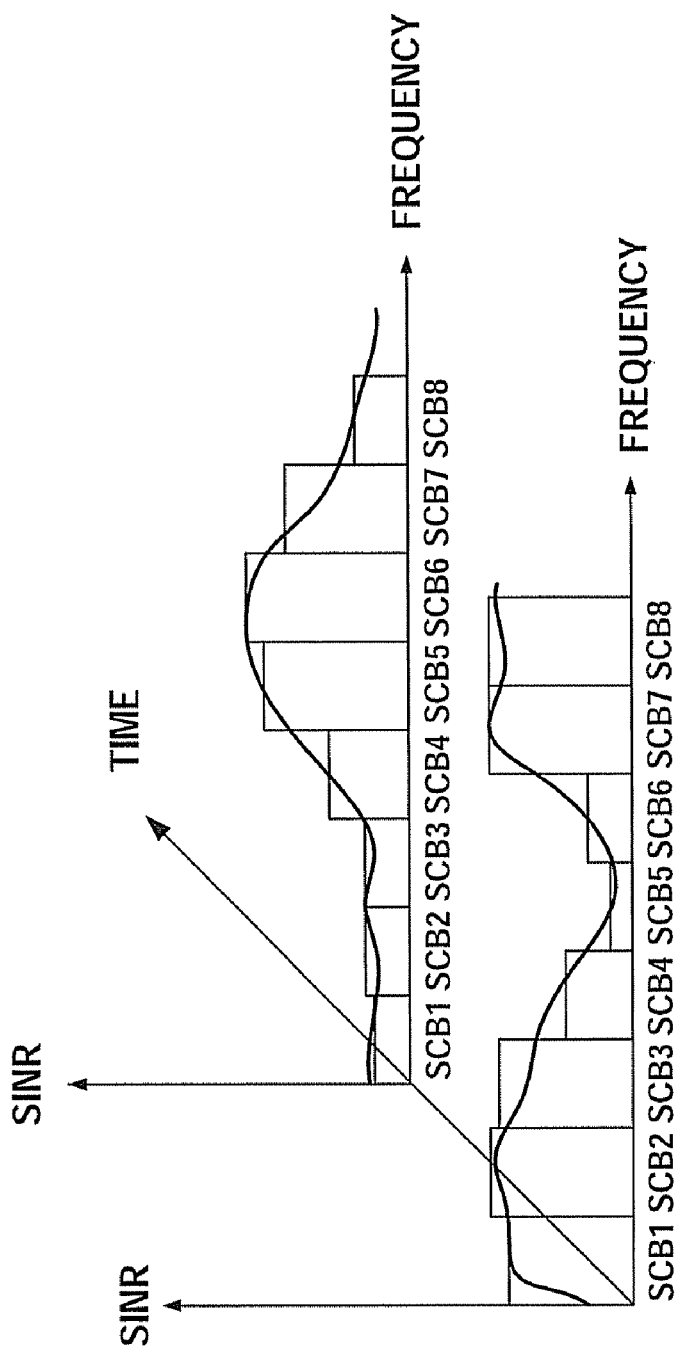
FIG. 1 shows communication quality of each subcarrier.
Figure 2:
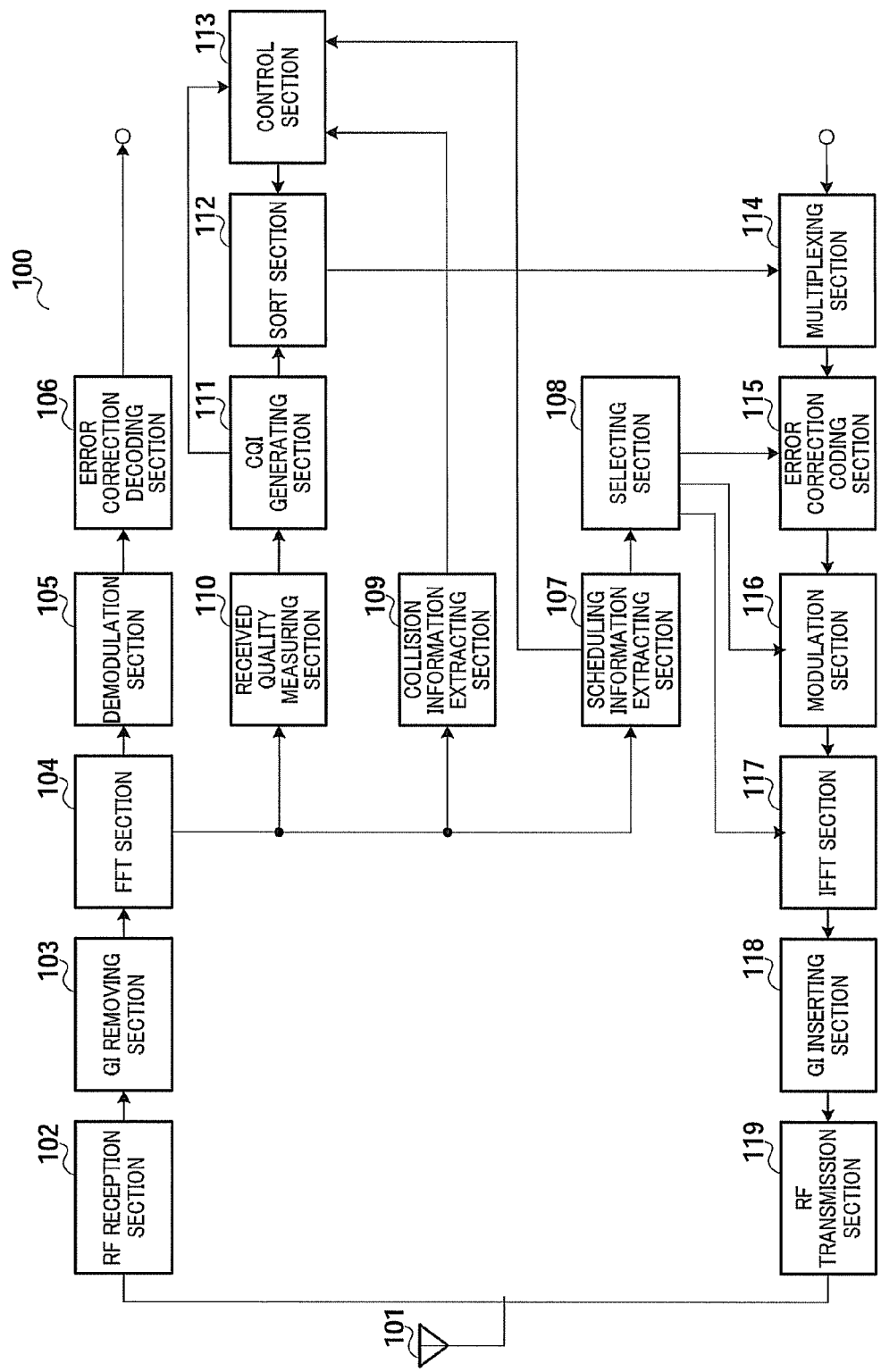
FIG. 2 is a block diagram showing a configuration of a communication terminal apparatus according to Embodiment 1 of the present invention.

FIG. 2 is a block diagram showing the configuration of communication terminal apparatus 100 according to Embodiment 1 of the present invention.

Antenna 101 receives and outputs an OFDM signal to RF reception section 102 and transmits a transmission signal inputted from RF transmission section 119.

RF reception section 102 down-converts the received signal inputted from antenna 101 from a radio frequency to a baseband frequency and outputs the result to guard interval (hereinafter "GI") removing section 103.

GI removing section 103 removes GIs from the received signal inputted from RF reception section 102 and outputs the result to fast Fourier transform (hereinafter "FFT") section 104.

FFT section 104 performs FFT on the received signal inputted from GI removing section 103 and outputs the result to demodulation section 105, scheduling information extracting section 107, collision information extracting section 109 and received quality measuring section 110.

Demodulation section 105 demodulates the received signal inputted from FFT section 104 and outputs the result to error correction decoding section 106.

Error correction decoding section 106 performs error correction decoding on the received signal inputted from demodulation section 105 and outputs the result as a received signal.

Scheduling information extracting section 107 extracts scheduling information included in the received signal inputted from FFT section 104 and outputs the scheduling information to selecting section 108 and control section 113. Herein, a subcarrier block is a bundle of a plurality of subcarriers consecutive or non-consecutive on the frequency axis, or a bundle of a plurality of subcarriers of a predetermined size and a plurality of transmission time intervals (hereinafter "TTI") in two dimensions of the time axis and the frequency axis. Further, the scheduling information is information of a result of scheduling that is processing, performed in the base station apparatus, for allocating resources for each subcarrier block to each communication terminal apparatus based on the received quality information. Allocated resources are, for example, the number of subcarrier blocks, modulation scheme, coding rate, transmission rate and transmission power.

Selecting section 108 extracts an MCS included in the scheduling information inputted from scheduling information extracting section 107, and based on the extracted MCS, controls signal processing in error correction coding section 115, modulation section 116 and IFFT section 117. More specifically, selecting section 108 stores resource allocation information that associates the MCS with the coding rate and modulation scheme, and using the MCS included in the scheduling information, selects the coding rate and modulation scheme by referring to the resource allocation information. Then, selecting section 108 controls error correction coding section 115 so that coding section 115 encodes a transmission signal at the coding rate shown in the MCS. Further, selecting section 108 controls modulation section 116 so that modulation section 116 modulates the transmission signal with the modulation scheme shown in the MCS. Furthermore, selecting section 108 controls inverse fast Fourier transform (hereinafter "IFFT") section 117 so as to allocate the transmission signal to a subcarrier block shown in the scheduling information.

Collision information extracting section 109 extracts collision information included in the received signal inputted from FFT section 104 and outputs the collision information to control section 113. Herein, the collision information is information of the number of communication terminal apparatuses that report CQI for the same subcarrier block at the same time.

Received quality measuring section 110 measures received quality using a pilot signal included in the received signal inputted from FFT section 104. At this point, received quality measuring section 110 measures the received quality per subcarrier block. Then, received quality measuring section 110 outputs the measurement result of the measured received quality to CQI generating section 111.

Based on the measurement result inputted from received quality measuring section 110, CQI generating section 111, which is a received quality information generating means, generates CQI (received quality information) that is information showing the measurement result, and outputs the CQI to sort section 112 and control section 113. At this point, CQI generating section 111 generates the CQI per subcarrier block.

Sort section 112 arranges the CQI inputted from CQI generating section 111 in descending order of the received quality or in ascending order of the received quality. Then, sort section 112 outputs the arranged CQI corresponding to the number designated from control section 113, in descending order of the received quality to multiplexing section 114.

Control section 113 designates the number of subcarrier blocks to output the CQI to sort section 112, based on the information of the number of subcarrier blocks for which the CQI has been transmitted, which is inputted from CQI generating section 111, the collision information inputted from collision information extracting section 109, and the scheduling information inputted from scheduling information extracting section 107. In addition, details of the operation of control section 113 will be described later.

Multiplexing section 114 multiplexes a transmission signal and the CQI inputted from sort section 112, generates a multiplexed signal, and outputs the generated multiplexed signal to error correction coding section 115.

Error correction coding section 115 performs error correction coding on the multiplexed signal inputted from multiplexing section 114 at a coding rate controlled in selecting section 108. Then, error correction coding section 115 outputs the multiplexed signal subjected to error correction coding to modulation section 116.

Modulation section 116 modulates the multiplexed signal inputted from error correction coding section 115 with a modulation scheme controlled in selecting section 108 and outputs the result to inverse fast Fourier transform (hereinafter "IFFT") section 117.

IFFT section 117 performs IFFT on the multiplexed signal inputted from modulation section 116, allocates the transmission signal to each subcarrier block, and thereby generates an OFDM signal. At this point, IFFT section 117 allocates the transmission signal to the subcarrier block controlled in selecting section 108, that is, subcarrier block allocated by scheduling in the base station apparatus. Then, IFFT section 117 outputs the generated OFDM signal to GI inserting section 118.

GI inserting section 118 inserts GIs to the OFDM signal inputted from IFFT section 117 and outputs the result to RF transmission section 119.

RF transmission section 119 up-converts the OFDM signal inputted from GI inserting section 118 from the baseband frequency to the radio frequency and outputs the result to antenna 101.

Figure 3:
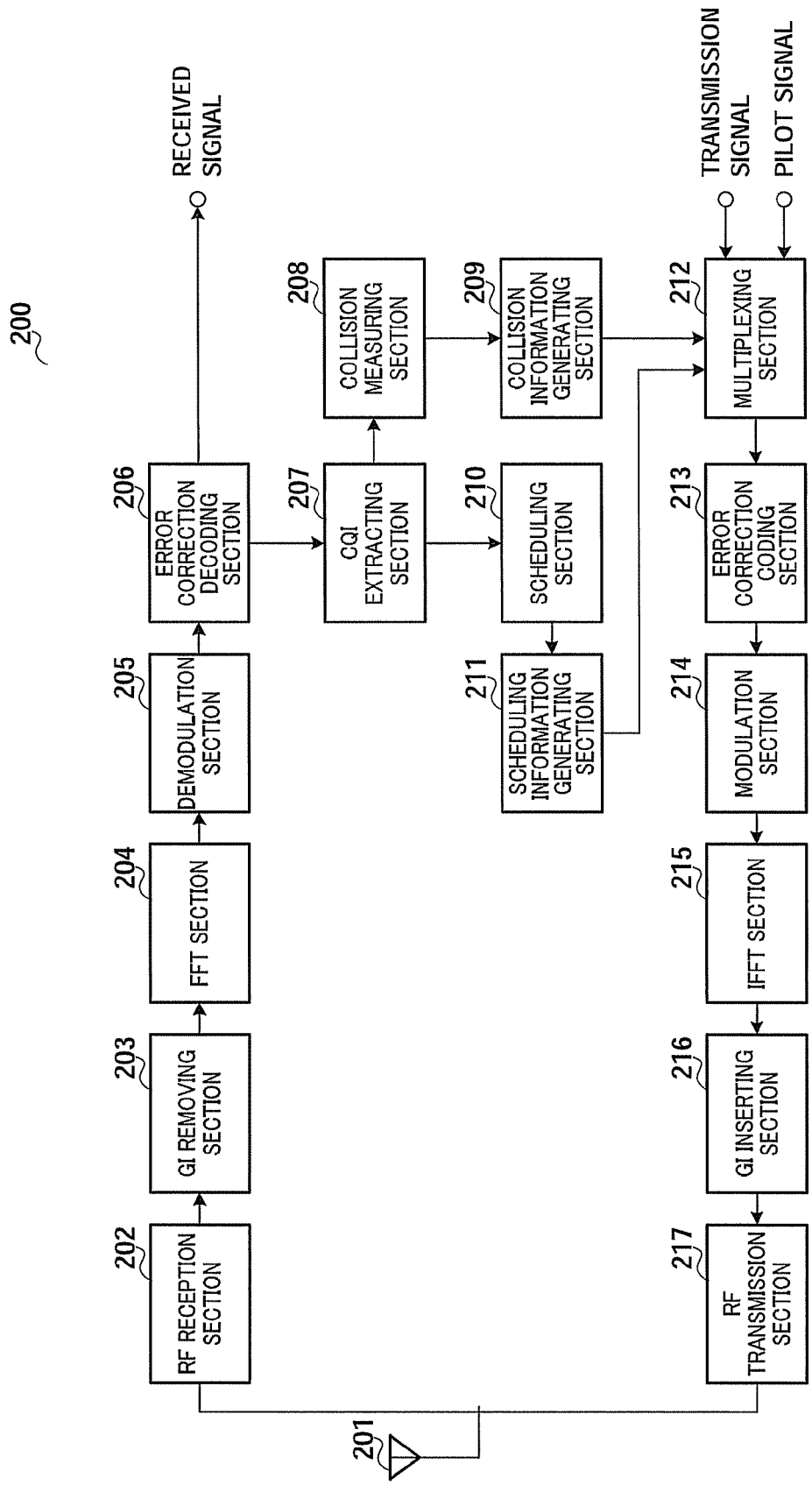
FIG. 3 is a block diagram showing a configuration of a base station apparatus according to Embodiment 1 of the present invention.

A configuration of base station apparatus 200 will be described next with reference to FIG. 3. FIG. 3 is a block diagram showing the configuration of base station apparatus 200.

Antenna 201 receives and outputs an OFDM signal to RF reception section 202 and transmits the OFDM signal inputted from RF transmission section 217.

RF reception section 202 down-converts the received signal inputted from antenna 201 from the radio frequency to the baseband frequency, and outputs the result to GI removing section 203.

GI removing section 203 removes the GIs from the received signal inputted from RF reception section 202 and outputs the result to FFT section 204.

FFT section 204 performs FFT on the received signal inputted from GI removing section 203 and outputs the result to demodulation section 205.

Demodulation section 205 demodulates the received signal inputted from FFT section 204 and outputs the result to error correction decoding section 206.

Error correction decoding section 206 performs error correction decoding on the received signal inputted from demodulation section 205, outputs the result to CQI extracting section 207, and outputs the result as a received signal.

CQI extracting section 207 extracts the CQI from the received signal inputted from error correction decoding section 206, and outputs the extracted CQI to collision measuring section 208 and scheduling section 210.

Collision measuring section 208 measures collisions based on the CQI inputted from CQI extracting section 207. More specifically, collision measuring section 208 measures the number of collisions for each subcarrier block. Then, collision measuring section 208 outputs the measurement result of the number of collisions to collision information generating section 209. Herein, the collision is that a plurality of communication terminal apparatuses transmit the CQI for the same subcarrier block at the same time.

Based on the measurement result inputted from collision measuring section 208, collision information generating section 209 generates collision information that is information showing the measurement result, and outputs the collision information to multiplexing section 212.

Scheduling section 210 performs scheduling based on the CQI inputted from CQI extracting section 207. For example, scheduling section 210 assigns a communication terminal apparatus that has transmitted the CQI with the best received quality for each subcarrier block, and selects an MCS of a combination of the coding rate and modulation scheme corresponding to the transmitted CQI. Then, scheduling section 210 outputs the information of the subcarrier block assigned to each communication terminal apparatus and MCS to scheduling information generating section 211.

Scheduling information generating section 211 generates scheduling information including the information of the subcarrier block assigned to each communication terminal apparatus and MCS inputted from scheduling section 210 and outputs the scheduling information to multiplexing section 212.

Multiplexing section 212 multiplexes the transmission signal, pilot signal, collision information inputted from collision information generating section 209, and scheduling information inputted from scheduling information generating section 211, generates a multiplexed signal, and outputs the generated multiplexed signal to error correction coding section 213.

Error correction coding section 213 performs error correction coding on the multiplexed signal inputted from multiplexing section 212 and outputs the result to modulation section 214.

Modulation section 214 modulates the multiplexed signal inputted from error correction coding section 213 and outputs the result to IFFT section 215.

IFFT section 215 performs IFFT on the multiplexed signal inputted from modulation section 214, generates an OFDM signal, and outputs the generated OFDM signal to GI inserting section 216.

GI inserting section 216 inserts GIs to the OFDM signal inputted from IFFT section 215 and outputs the result to RF transmission section 217.

RF transmission section 217 up-converts the OFDM signal inputted from GI inserting section 216 from the baseband frequency to the radio frequency and outputs the result to antenna 201.

Operations of communication terminal apparatus 100 and base station apparatus 200 will be described next.

Figure 4:
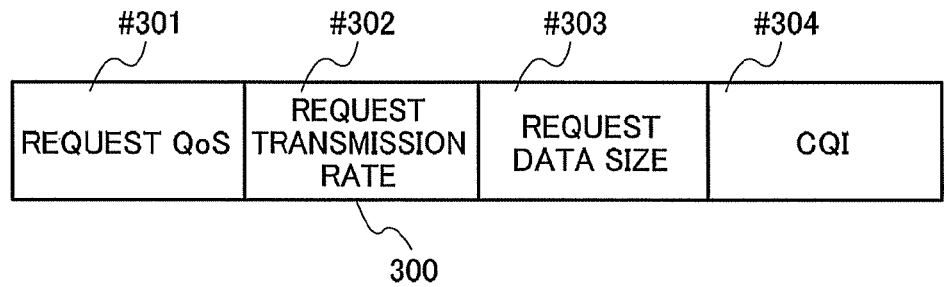
FIG. 4 shows a format of a signaling signal according to Embodiment 1 of the present invention.

First, base station apparatus 200 determines the number of subcarrier blocks to transmit the CQI, based on the number of communication terminal apparatuses 100 communicating in the cell of base station apparatus 200, QoS requested from communication terminal apparatuses 100, transmission rate requested from communication terminal apparatuses 100, data size of transmission data requested from communication terminal apparatuses 100, the distance between communication terminal apparatuses 100 and base station apparatus 200 and the like. Communication terminal apparatus 100 requests QoS, transmission rate and data size and transmits CQI by transmitting a signaling signal to base station apparatus 200. FIG. 4 shows a format of signaling signal 300 transmitted from communication terminal apparatus 100 to base station apparatus 200. Signaling signal 300 is comprised of requested QoS #301, which is information of QoS requested by communication terminal apparatus 100, requested transmission rate #302, which is information of a transmission rate requested by communication terminal apparatus 100, requested data size #303, which is information of a data size requested by communication terminal apparatus 100 and CQI #304.

Figure 5:
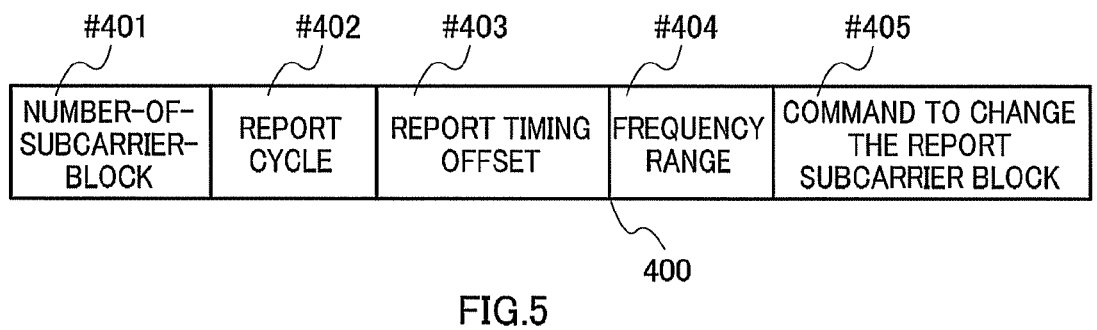
FIG. 5 shows a format of CQI report control information according to Embodiment 1 of the present invention.

Base station apparatus 200 receiving signaling signal 300 determines the transmission rate of communication terminal apparatus 100 based on the request of communication terminal apparatus 100, and further determines the number of subcarrier blocks assigned to communication terminal apparatus 100 that can achieve the determined transmission rate. FIG. 5 shows a format of CQI report control information 400 transmitted from base station apparatus 200 to communication terminal apparatus 100. In FIG. 5, number-of-subcarrier-block #401 is to specify the number of subcarrier blocks to report, and report cycle #402 is to specify a cycle of transmitting CQI. Further, report timing offset #403 is to specify timing offset of report within the report cycle, and by making the report timing different between communication terminal apparatuses 100, it is possible to decrease report collisions between communication terminal apparatuses 100 and reduce uplink interference. Further, frequency range #404 is to specify a frequency range of the subcarrier block that communication terminal apparatus 100 should report, and by making the frequency range of the subcarrier block to report different between communication terminal apparatuses 100, it is possible to decrease report collisions between communication terminal apparatuses 100. Furthermore, command #405 to change the report subcarrier block is to command communication terminal apparatus 100 to change the subcarrier block number to report, and has an effect of dispersing subcarrier blocks to report when the collision is high in a specific subcarrier block number.

Figure 6:
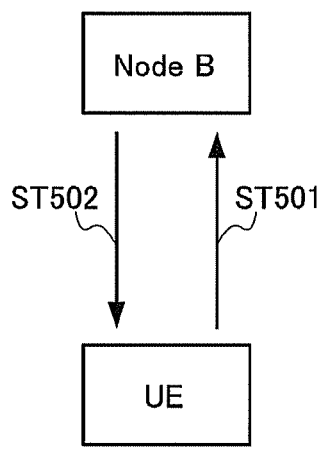
FIG. 6 shows transmission and reception of a signal between the communication terminal apparatus and the base station apparatus according to Embodiment 1 of the present invention.
Figure 7:
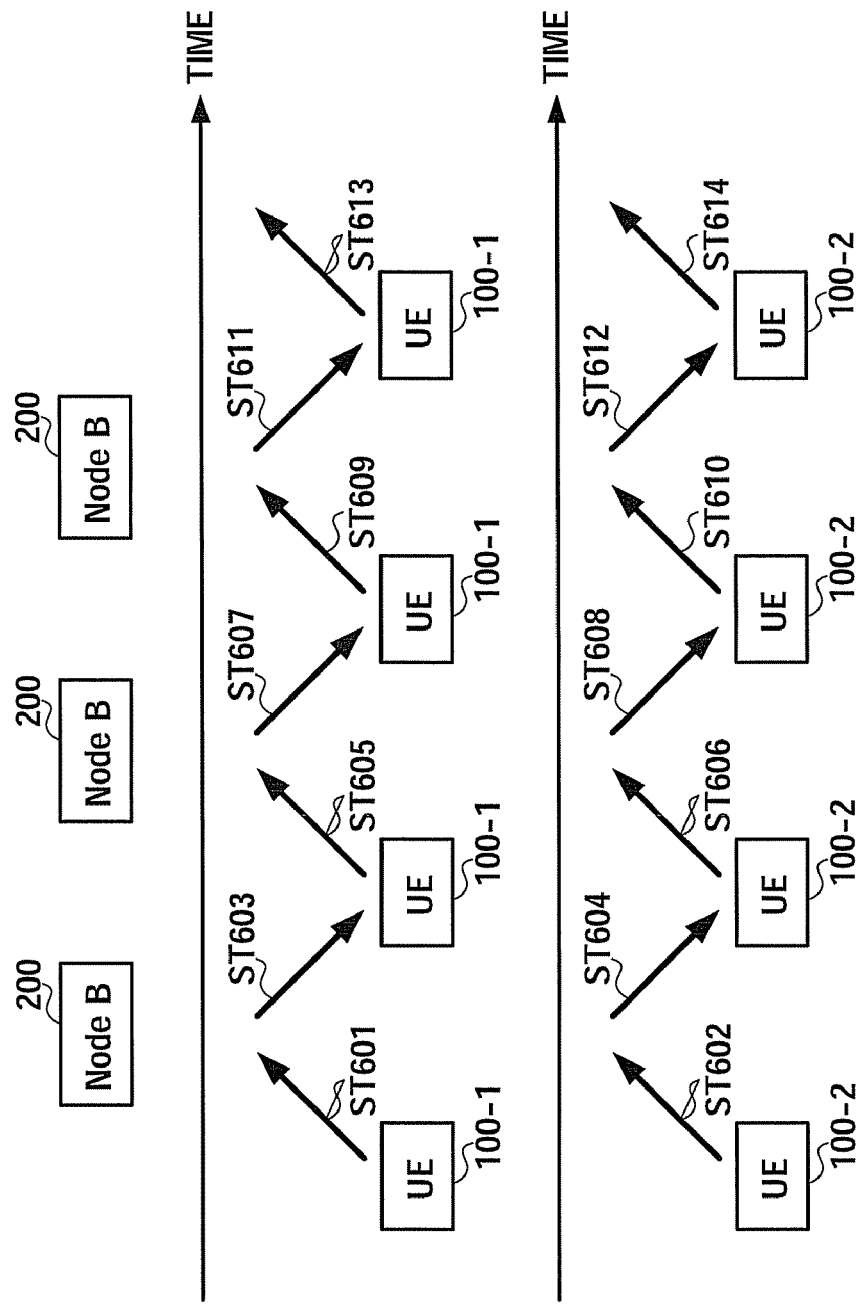
FIG. 7 shows operations of the communication terminal apparatus and the base station apparatus according to Embodiment 1 of the present invention.

FIG. 6 shows transmission and reception of a signal between base station apparatus 200 and communication terminal apparatus 100, and FIG. 7 shows operations of communication terminal apparatus 100 and base station apparatus 200. In addition, in FIG. 7, the horizontal axis shows the time, and communication terminal apparatuses 100-1 and 100-2 have the same configuration as that of communication terminal apparatus 100 as shown in FIG. 2. Further, FIG. 7 describes a case where two communication terminal apparatuses 100 communicate with base station apparatus 200, but the number of communication terminal apparatuses 100 can be set arbitrarily.

Communication terminal apparatus 100 transmits signaling signal 300 of FIG. 4 in uplink (step ST501), and base station apparatus 200 transmits CQI report control information 400 of FIG. 5 in downlink (step ST502). Described up to this point is the processing of an initial report before controlling the number of subcarrier blocks.

The operation when controlling the number of subcarrier blocks to transmit the CQI after the initial report will be described next. First, the operation when the collision does not occur will be described.

By the processing of the initial report, base station apparatus 200 commands communication terminal apparatus 100 to transmit the CQI of at least one subcarrier block in number-of-subcarrier-block #401. In addition, in base station apparatus 200, the number of CQI designated in number-of-subcarrier-block #401 is not limited to one, but may be an arbitrary number.

Figure 8:
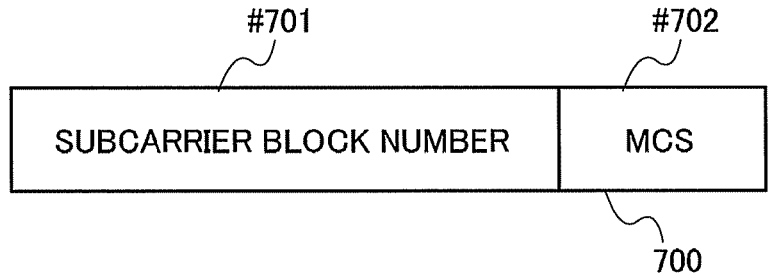
FIG. 8 shows a format of CQI according to Embodiment 1 of the present invention.

Each of communication terminal apparatuses 100-1 and 100-2 measures the received quality of each subcarrier block in received quality measuring section 110, and generates the CQI in CQI generating section 111. Then, communication terminal apparatus 100 transmits one CQI of a subcarrier block, for example, with the best received quality out of the generated pieces of CQI to base station apparatus 200 (step ST601 and step ST602). FIG. 8 shows a format of CQI 700 transmitted from communication terminal apparatuses 100-1 and 100-2. CQI 700 is comprised of subcarrier block number #701 to report and MCS #702 showing the received quality of the subcarrier block to report.

Next, base station apparatus 200 receiving the CQI performs scheduling in scheduling section 210 based on the CQI. As a result of the scheduling, subcarrier blocks are not allocated to communication terminal apparatuses 100-1 and 100-2, and base station apparatus 200 transmits the scheduling information showing that no subcarrier block is allocated to each of communication terminal apparatuses 100-1 and 100-2 (step ST603 and step ST604).

Figure 9:
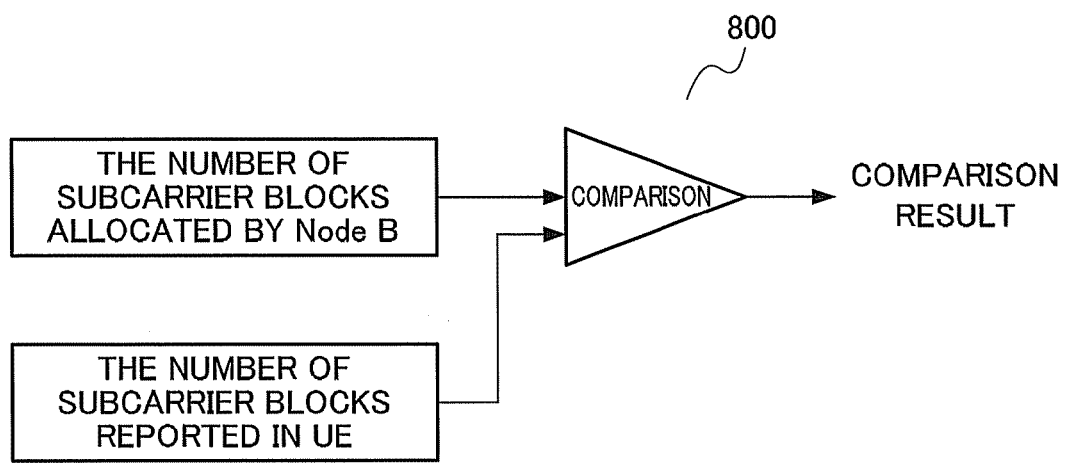
FIG. 9 shows a comparing circuit according to Embodiment 1 of the present invention.

Communication terminal apparatuses 100-1 and 100-2 receiving the scheduling information extract the scheduling information in scheduling information extracting section 107. Then, in communication terminal apparatuses 100-1 and 100-2, control section 113 compares the number of reported subcarrier blocks with the number of allocated subcarrier blocks, using comparing circuit 800 as shown in FIG. 9. As a result of the comparison, the number of subcarrier blocks for which communication terminal apparatuses 100-1 and 100-2 have reported the CQI is "1", and the number of subcarrier blocks allocated in base station apparatus 200 is "0". Therefore, based on the comparison result outputted from comparing circuit 800, control section 113 increases the number of subcarrier blocks to report the CQI by one. In communication terminal apparatuses 100-1 and 100-2, sort section 112 outputs two pieces of the CQI. By this means, each of communication terminal apparatuses 100-1 and 100-2 transmits two pieces of the CQI to base station apparatus 200 (step ST605 and step ST606).

Next, base station apparatus 200 receiving the CQI performs scheduling in scheduling section 210 based on the CQI. As a result of the scheduling, subcarrier blocks are not allocated to communication terminal apparatuses 100-1 and 100-2, and base station apparatus 200 transmits the scheduling information showing that no subcarrier block is allocated to each of communication terminal apparatuses 100-1 and 100-2 (step ST607 and step ST608).

Communication terminal apparatuses 100-1 and 100-2 receiving the scheduling information extract the scheduling information in scheduling information extracting section 107. Then, in communication terminal apparatuses 100-1 and 100-2, control section 113 compares the number of reported subcarrier blocks with the number of allocated subcarrier blocks, using comparing circuit 800. As a result of the comparison, the number of subcarrier blocks for which communication terminal apparatuses 100-1 and 100-2 have reported the CQI is "2", and the number of subcarrier blocks allocated in base station apparatus 200 is "0". Therefore, based on the comparison result outputted from comparing circuit 800, control section 113 further increases the number of subcarrier blocks to report the CQI by one. In communication terminal apparatuses 100-1 and 100-2, sort section 112 outputs three pieces of CQI. By this means, each of communication terminal apparatuses 100-1 and 100-2 transmits three pieces of CQI to base station apparatus 200 (step ST609 and step ST610).

Next, base station apparatus 200 receiving the CQI performs scheduling in scheduling section 210 based on the CQI. As a result of the scheduling, one subcarrier block is allocated to each of communication terminal apparatuses 100-1 and 100-2, and base station apparatus 200 transmits the scheduling information showing that one subcarrier block is allocated to each of communication terminal apparatuses 100-1 and 100-2 (step ST611 and step ST612). At this point, base station apparatus selects an MCS based on the CQI in scheduling section 210 and transmits the scheduling information including the selected MCS.

Communication terminal apparatuses 100-1 and 100-2 receiving the scheduling information extract the scheduling information in scheduling information extracting section 107. Then, in communication terminal apparatuses 100-1 and 100-2, control section 113 compares the number of reported subcarrier blocks with the number of allocated subcarrier blocks, using comparing circuit 800. As a result of the comparison, the number of subcarrier blocks for which communication terminal apparatuses 100-1 and 100-2 have reported the CQI is "3", and the number of subcarrier blocks allocated in base station apparatus 200 is "1". Therefore, based on the comparison result outputted from comparing circuit 800, control section 113 decreases the number of subcarrier blocks to report the CQI by one. In communication terminal apparatuses 100-1 and 100-2, sort section 112 outputs two pieces of CQI. By this means, each of communication terminal apparatuses 100-1 and 100-2 transmits two pieces of CQI to base station apparatus 200 (step ST613 and step ST614). Thereafter, communication terminal apparatuses 100-1 and 100-2 and base station apparatus 200 can adaptively control the number of subcarrier blocks to transmit the CQI by repeating the similar processing.

The comparison in comparing circuit 800 is not limited to comparison between the number of subcarrier blocks for which each of communication terminal apparatuses 100-1 and 100-2 has reported the CQI and the number of subcarrier blocks allocated in base station apparatus 200, and may be comparison between an allocation rate, which is a ratio of the number of subcarrier blocks actually allocated in base station 200 to the number of subcarrier blocks for which each of communication terminal apparatuses 100-1 and 100-2 has reported the CQI, and a threshold. In this case, communication terminal apparatuses 100-1 and 100-2 increase the number of subcarrier blocks to report the CQI when the allocation rate is smaller than the threshold, and decreases the number of subcarrier blocks to report the CQI when the allocation rate is equal to or greater than the threshold. In addition, the number of subcarrier blocks to increase and the number of subcarrier blocks to decrease are not limited to one, and it is possible to increase or decrease subcarrier blocks by an arbitrary number. Further, the number of subcarrier blocks to increase/decrease may be changed.

The operation when the collision occurs will be described next with reference to FIG. 7. For example, when the CQI reported in step ST609 and step ST610 overlaps with each other in one subcarrier block, base station apparatus 200 detects that the collision occurs in collision measuring section 208, and generates the collision information showing that the number of collisions is one in collision information generating section 209. Then, base station apparatus 200 transmits the collision information to communication terminal apparatuses 100-1 and 100-2 (step ST611 and step ST612).

Communication terminal apparatuses 100-1 and 100-2 receiving the collision information extract the collision information in collision information extracting section 109. Then, in communication terminal apparatuses 100-1 and 100-2, control section 113 increases the number of subcarrier blocks to report the CQI by one. In communication terminal apparatuses 100-1 and 100-2, sort section 112 outputs four pieces of CQI. By this means, each of communication terminal apparatuses 100-1 and 100-2 transmits four pieces of CQI to base station apparatus 200 (step ST609 and step ST610). At this point, in communication terminal apparatuses 100-1 and 100-2, control section 113 controls the number of subcarrier blocks to report the CQI, further considering the result of comparison between the number of reported subcarrier blocks and the number of allocated subcarrier blocks in comparing circuit 800, in addition to the collision information.

In addition, communication terminal apparatuses 100-1 and 100-2 may consider one of the collision information and the comparison result in comparing circuit 800, in addition to considering both the collision information and the comparison result in comparing circuit 800. For example, in the case of considering only the comparison result in comparing circuit 800, communication terminal apparatuses 100-1 and 100-2 compare a cumulative allocation rate, which is a ratio of the number of actually allocated subcarrier blocks to the number of reports within predetermined previous time, or an average value with a threshold. As a result of comparison, communication terminal apparatuses 100-1 and 100-2 increase the number of subcarrier blocks to report the CQI when the cumulative allocation rate or average value is smaller than the threshold, and decreases the number of subcarrier blocks to report the CQI when the cumulative allocation rate or average value is equal to or greater than the threshold. By this means, as compared with the case where the base station apparatus transmits the collision information, it is possible to reduce overhead due to signaling in downlink. Further, the number of subcarrier blocks to increase and the number of subcarrier blocks to decrease are not limited to one, and it is possible to increase or decrease subcarrier blocks by an arbitrary number. Furthermore, the number of subcarrier blocks to increase/decrease may be changed.

Figure 10:
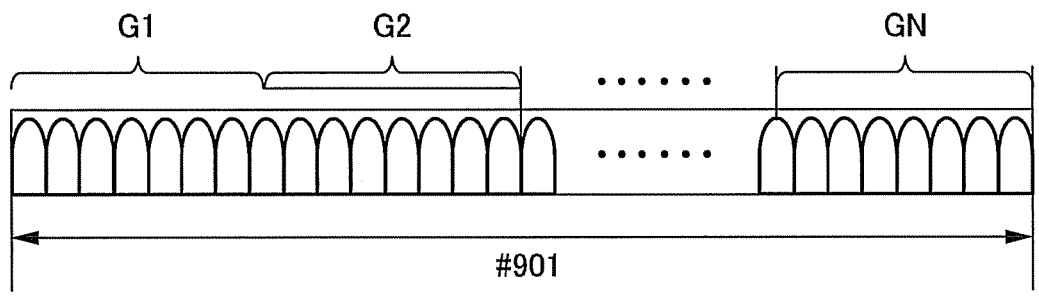
FIG. 10 shows a method of forming a subcarrier block according to Embodiment 1 of the present invention.
Figure 11:
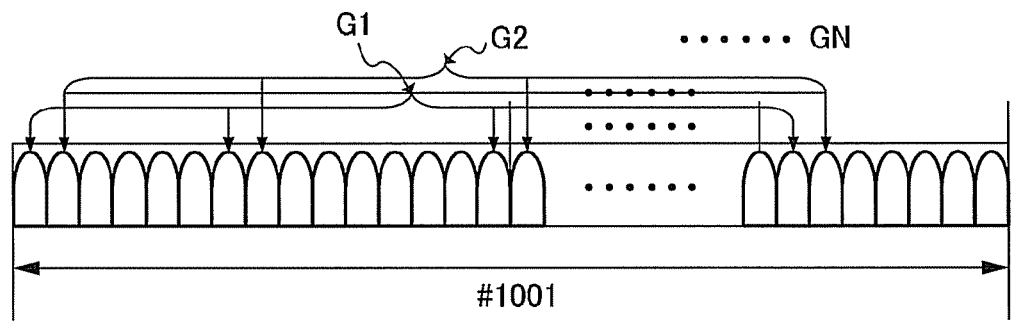
FIG. 11 shows the method of forming a subcarrier block according to Embodiment 1 of the present invention.

FIGS. 10 and 11 show the method of grouping a plurality of subcarriers in a predetermined communication band and forming a subcarrier block. In the method in FIG. 10, a predetermined number of subcarriers in a predetermined communication band (for example, 20 MHz) #901 are selected sequentially from the end and grouped to form N (N is a natural number of two or more) subcarrier blocks, G1 to GN. In the method of FIG. 11, a predetermined number of non-consecutive subcarriers at fixed intervals in a predetermined communication band (for example, 20 MHz) #1001 are selected and grouped to form N subcarrier blocks, G1 to GN.

Thus, according to Embodiment 1, based on a result of comparison between the number of subcarrier blocks for which the communication terminal apparatus has reported the CQI and the number of actually allocated subcarrier blocks, or based on the collision information, the number of subcarrier blocks for which the communication terminal apparatus reports the CQI is controlled, so that it is possible to reduce the interference in uplink without wasting reports of received quality, perform optimal allocation by scheduling, prevent resources from being lost, and maintain fairness of transmission allocation by scheduling.

Figure 12:
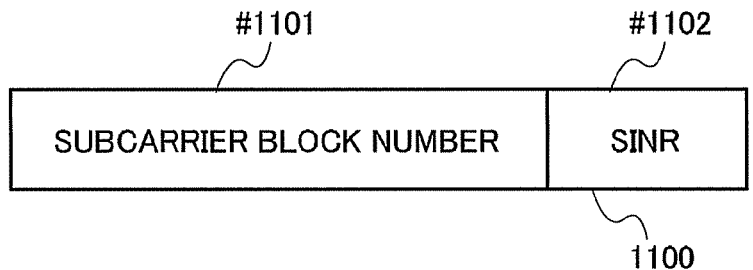
FIG. 12 shows the format of CQI according to Embodiment 1 of the present invention.

In addition, in Embodiment 1, communication terminal apparatus 100 includes an MCS in CQI to report the received quality, but this is by no means limiting, and communication terminal apparatus 100 may include an SINR in CQI to report the received quality. FIG. 12 shows a format of CQI 1100 when the received quality is reported with an SINR included in CQI. CQI 1100 is comprised of subcarrier block number #1101 to report and SINR #1102 measured in received quality measuring section 110.

Embodiment 2

Figure 13:
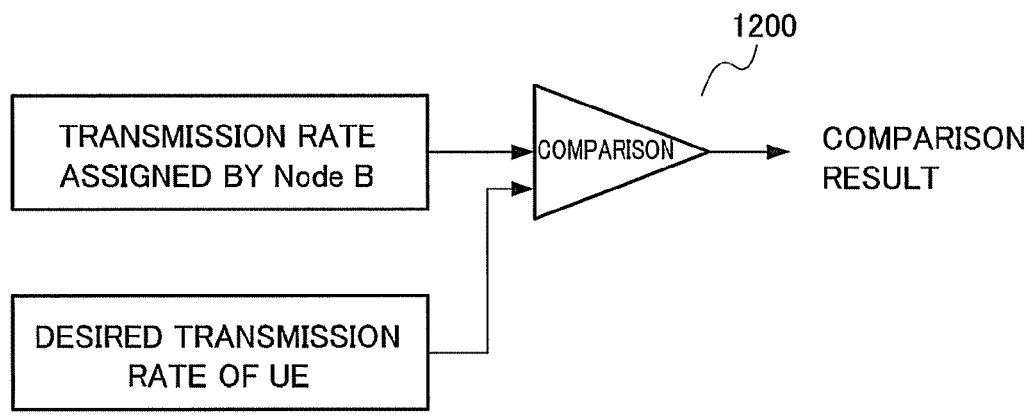
FIG. 13 shows a comparing circuit according to Embodiment 2 of the present invention.

FIG. 13 is a block diagram showing a configuration of comparing circuit 1200 according to Embodiment 2 of the present invention. In addition, in Embodiment 2, a configuration of a communication terminal apparatus is the same as that in FIG. 2, a configuration of a base station apparatus is the same as that in FIG. 3, and so descriptions thereof will be omitted.

In communication terminal apparatuses 100-1 and 100-2, using comparing circuit 1200 in FIG. 13, control section 113 compares a desired transmission rate by the reported CQI and a transmission rate actually assigned in base station apparatus 200. In addition, communication terminal apparatuses 100-1 and 100-2 are capable of knowing the assigned transmission rate by receiving the scheduling information. Further, as the transmission rate, for example, a bit rate is used.

As a result of comparison, control section 113 increases the number of subcarrier blocks to report the CQI when the transmission rate assigned in base station apparatus 200 is smaller than the desired transmission rate desired by communication terminal apparatuses 100-1 and 100-2, and decreases the number of subcarrier blocks to report the CQI when the transmission rate assigned in base station apparatus 200 is the same as the desired transmission rate desired by communication terminal apparatuses 100-1 and 100-2. In addition, the operations of the communication terminal apparatus and base station apparatus are the same as those in Embodiment 1 except the configuration for comparing the number of subcarrier blocks for which the CQI has been reported with the number of actually allocated subcarrier blocks being replaced with the configuration for comparing the desired transmission rate by the reported CQI with the number of actually allocated subcarrier blocks, and so descriptions thereof will be omitted.

Thus, according to Embodiment 2, based on a result of comparison between the desired transmission rate by the CQI reported by the communication terminal apparatus and the actually assigned transmission rate, or based on the collision information, the number of subcarrier blocks for which the communication terminal apparatus reports the CQI is controlled, so that it is possible to reduce the interference in uplink without wasting reports of received quality, perform optimal allocation by scheduling, prevent resources from being lost, and maintain fairness of transmission allocation by scheduling.

In addition, in Embodiment 2, the number of subcarrier blocks is controlled based on a result of comparison between the desired transmission rate and actually assigned transmission rate, but this is by no means limiting, and the number of subcarrier blocks may be controlled based on a result of comparison between a ratio of the actually assigned transmission rate to the desired transmission rate and a threshold. In this case, the number of subcarrier blocks to transmit the CQI increases when the ratio of the actually assigned transmission rate to the desired transmission rate is smaller than the threshold, and decreases when the ratio of the actually assigned transmission rate to the desired transmission rate is equal to or greater than the threshold.

Embodiment 3

FIG. 14 shows an instantaneous allocation rate and a cumulative allocation rate measured in a communication terminal apparatus according to Embodiment 3 of the present invention. In addition, in Embodiment 3, a configuration of the communication terminal apparatus is the same as that in FIG. 2, a configuration of a base station apparatus is the same as that in FIG. 3, and so descriptions thereof will be omitted. Further, in FIG. 14, SCB is a subcarrier block.

From FIG. 14, the number of reports or report time number (A) is the number of times or time number that the communication terminal apparatus reports the CQI to the base station apparatus, and, for example, the communication terminal apparatus reports in one TTI cycle. Further, the number of report subcarrier blocks (B) designated from the base station apparatus (Node B) is the number of subcarrier blocks to report the CQI, which is designated from the base station apparatus to the communication terminal apparatus, and is all "1" in the case of FIG. 14. (B) is designated by number-of-subcarrier-block #401 in CQI report control information 400 of FIG. 5. Further, the number of reported subcarrier blocks (SCB) (C) is the number of subcarrier blocks for which the communication terminal apparatus has reported the CQI to the base station apparatus.

Furthermore, the number of actually allocated subcarrier blocks (SCB) (D) is the number of subcarrier blocks actually allocated by scheduling in the base station apparatus. Still furthermore, the instantaneous allocation rate (E) is obtained from (D)/(B). Moreover, the cumulative allocation rate (F) is obtained from (Total of (D))/(A).

Control section 113 of communication terminal apparatus 100 compares (E) or (F) with the threshold, and commands to increase the number of subcarrier blocks to report the CQI when (E) or (F) is smaller than the threshold, and commands to decrease the number of subcarrier blocks to report the CQI when (E) or (F) is equal to or greater than the threshold.

Thus, according to Embodiment 3, based on the instantaneous allocation rate or the cumulative allocation rate, or based on the collision information, the number of subcarrier blocks for which the communication terminal apparatus reports the CQI is controlled, so that it is possible to reduce the interference in uplink without wasting reports of received quality, perform optimal allocation by scheduling, prevent resources from being lost, and maintain fairness of transmission allocation by scheduling.

Embodiment 4

Figure 15:
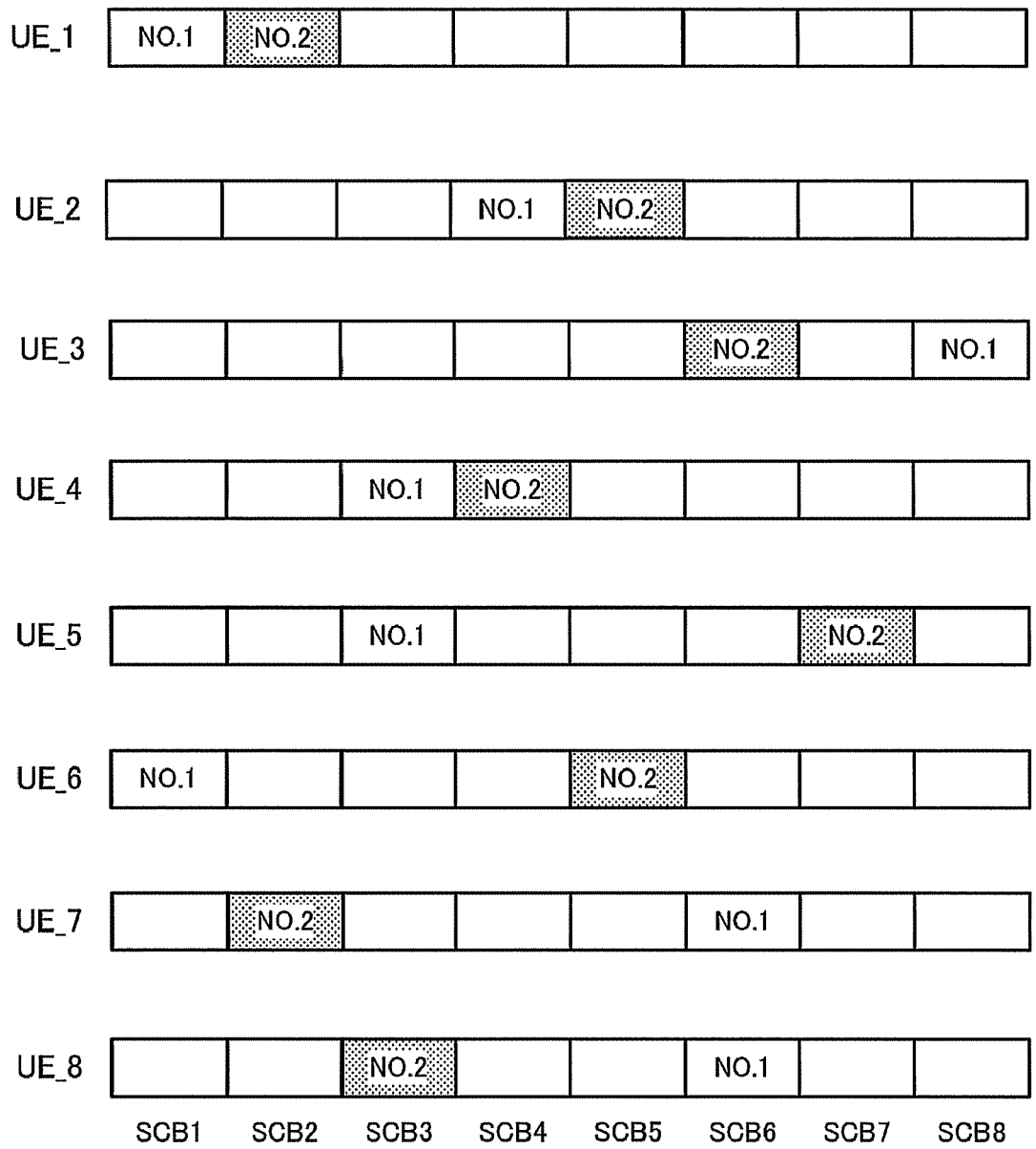
FIG. 15 shows a subcarrier block for which communication terminal apparatuses report CQI according to Embodiment 4 of the present invention.

FIG. 15 shows a subcarrier block for which each communication terminal apparatus reports CQI according to Embodiment 4 of the present invention. In addition, In Embodiment 4, a configuration of the communication terminal apparatus is the same as that in FIG. 2, a configuration of a base station apparatus is the same as that in FIG. 3, and so descriptions thereof will be omitted.

FIG. 15 shows the case where eight communication terminal apparatuses communicate with a single base station apparatus, for example, and the total number of subcarrier blocks is eight, for example. In addition, in FIG. 15, SCB is a subcarrier block, and UE1 to UE8 are the communication terminal apparatuses. Further, in FIG. 15, for convenience in description, a case will be described where each communication terminal apparatus reports the CQI for two subcarrier blocks, but the present invention is applicable to a case where each communication terminal apparatus individually reports the CQI for an arbitrary number of three or more subcarrier blocks.

When control section 113 of each communication terminal apparatus 100 judges that the CQI of one subcarrier block is outputted based on the number of subcarrier blocks for which the CQI has been transmitted and the number of actually allocated subcarrier blocks, control section 113 actually increases the number of subcarrier blocks to transmit the CQI by one, and commands sort section 112 to output the CQI for two subcarrier blocks (No. 1 and No. 2). As a result, each communication terminal apparatus transmits the CQI of two subcarrier blocks. For example, when UE1 transmits one CQI, UE1 collides with UE6 in subcarrier block 1, and so no subcarrier block is allocated to UE1 when the base station apparatus allocates subcarrier block 1 to UE6. However, in Embodiment 4, UE1 reports the CQI also for subcarrier block 2, and so there is the possibility that subcarrier block 2 is allocated to UE1.

Figure 16:
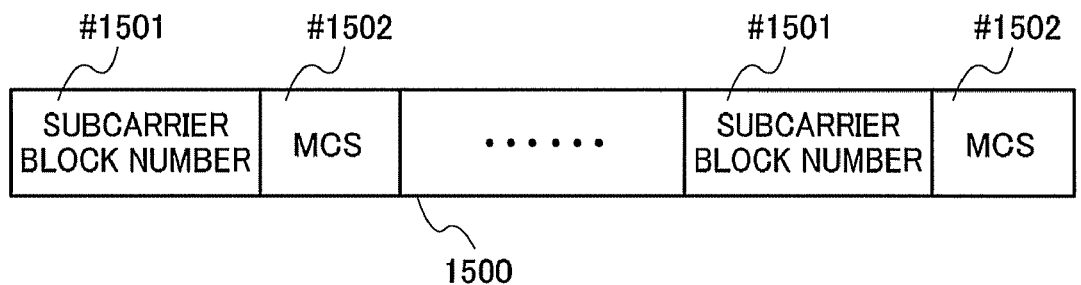
FIG. 16 shows a format of CQI according to Embodiment 4 of the present invention.

FIG. 16 shows a format of CQI 1500 transmitted from each of communication terminal apparatuses UE1 to UE8. CQI 1500 is comprised of subcarrier block number #1501 to report and MCS #1502 showing the received quality of the subcarrier block to report.

Thus, according to Embodiment 4, in addition to the effect of above-mentioned Embodiment 1, by providing the number of subcarrier blocks to report the CQI with redundancy, it is possible to increase the probability of allocating transmission.

In addition, Embodiment 4 is applicable to above-mentioned Embodiment 2 or 3.

Embodiment 5

Figure 17:
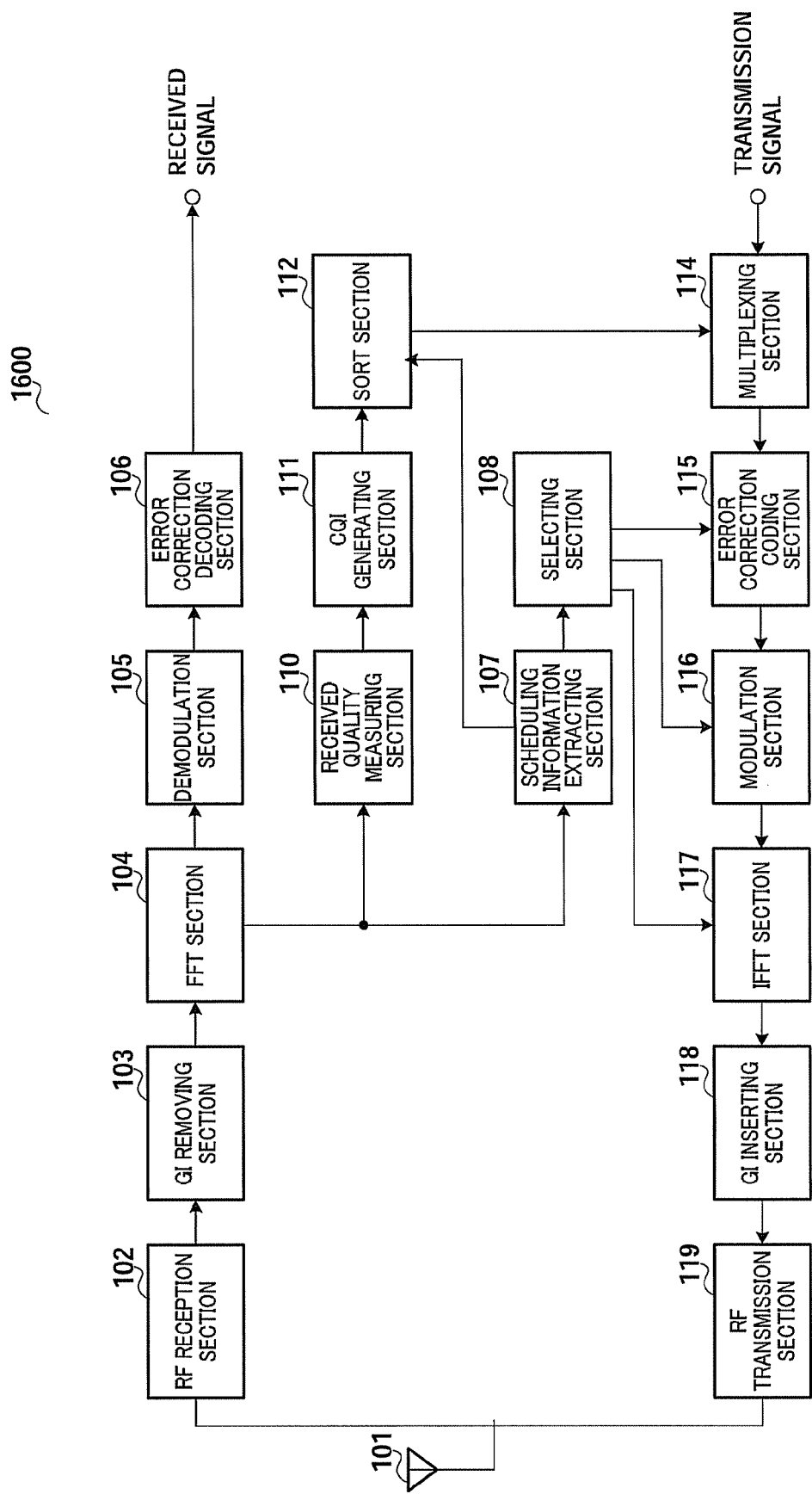
FIG. 17 is a block diagram showing a configuration of a communication terminal apparatus according to Embodiment 5 of the present invention.

FIG. 17 is a block diagram showing a configuration of communication terminal apparatus 1600 according to Embodiment 5 of the present invention.

Communication terminal apparatus 1600 according to Embodiment 5 of the present invention eliminates collision information extracting section 109 and control section 113, as shown in FIG. 17, in communication terminal apparatus 100 according to Embodiment 1 as shown in FIG. 2. In addition, in FIG. 17, the same components as those in FIG. 2 will be assigned the same reference numerals, and so descriptions thereof will be omitted.

FFT section 104 performs FFT on a received signal inputted from GI removing section 103 and outputs the result to demodulation section 105, scheduling information extracting section 107 and received quality measuring section 110.

Scheduling information extracting section 107 extracts the scheduling information that is included in the received signal inputted from FFT section 104 and that is information of a result of the processing of allocating resources for each subcarrier block in the base station apparatus, and outputs the scheduling information to selecting section 108 and sort section 112.

Based on a measurement result inputted from received quality measuring section 110, CQI generating section 111 generates CQI that is information showing the measurement result and outputs the CQI to sort section 112. At this point, CQI generating section 111 generates the CQI per subcarrier block.

Sort section 112 sorts the CQI inputted from CQI generating section 111 in descending order of the received quality or in ascending order of the received quality. Then, sort section 112 outputs the sorted CQI corresponding to the number designated from control section 113 to multiplexing section 114 in descending order of the received quality.

Figure 18:
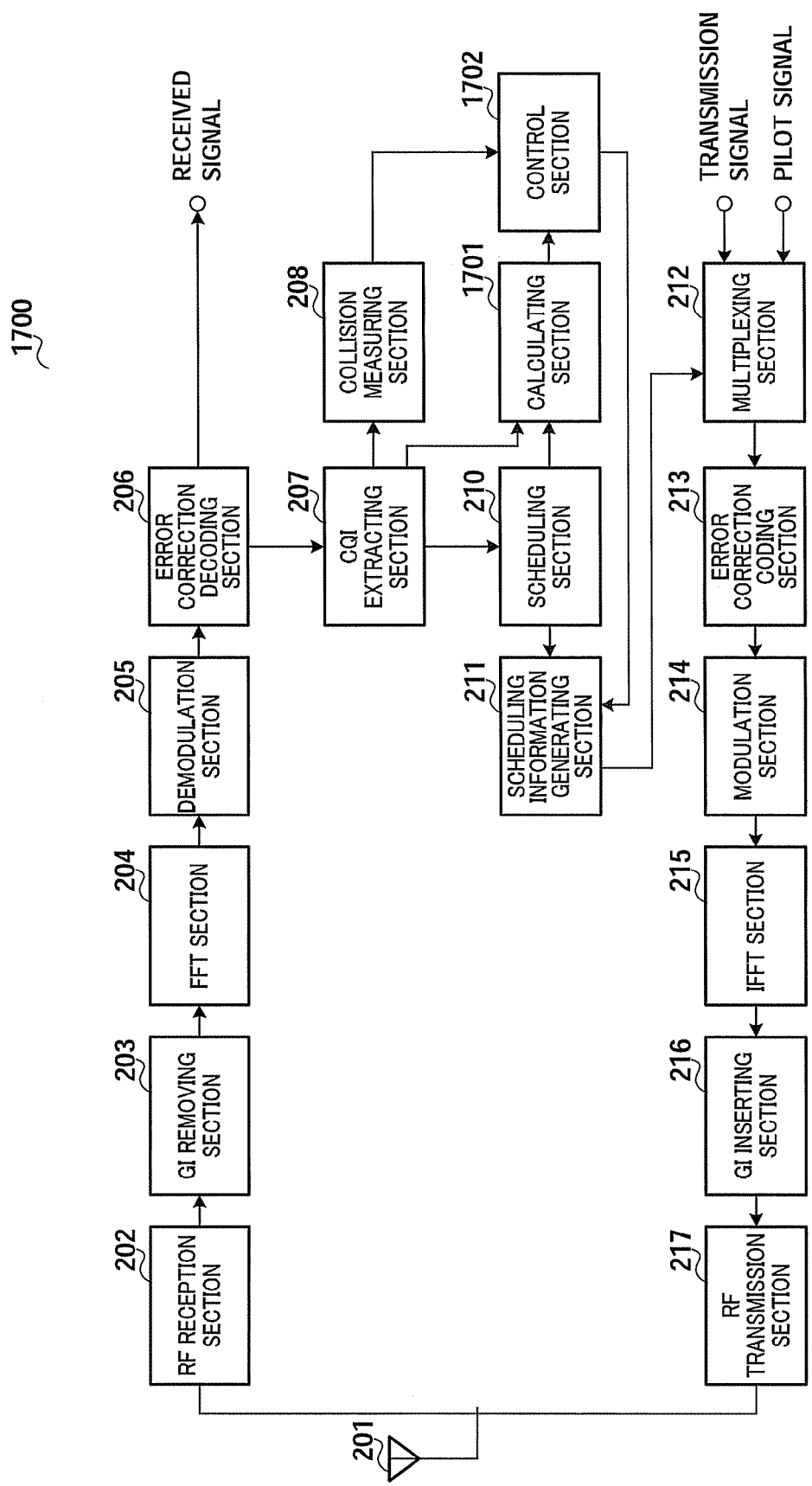
FIG. 18 is a block diagram showing a configuration of a base station apparatus according to Embodiment 5 of the present invention.

A configuration of base station apparatus 1700 will be described next with reference to FIG. 18. FIG. 18 is a block diagram showing the configuration of base station apparatus 1700.

Base station apparatus 1700 according to Embodiment 5 eliminates collision information generating section 209 and adds calculating section 1701 and control section 1702, as shown in FIG. 18, in base station apparatus 200 according to Embodiment 1 as shown in FIG. 3. In addition, the same components as those in FIG. 3 will be assigned the same reference numerals, and so descriptions thereof will be omitted.

CQI extracting section 207 extracts the CQI from a received signal inputted from error correction decoding section 206, and outputs the extracted CQI to collision measuring section 208, scheduling section 210 and calculating section 1701.

Collision measuring section 208 measures collision based on the CQI inputted from CQI extracting section 207. More specifically, collision measuring section 208 measures the number of collisions for each subcarrier block. Then, collision measuring section 208 outputs a measurement result of the number of collisions to control section 1702.

Scheduling section 210 performs scheduling based on the CQI inputted from CQI extracting section 207. For example, scheduling section 210 assigns a communication terminal apparatus that has transmitted the CQI with the best received quality for each subcarrier block, and selects an MCS of a combination of the coding rate and modulation scheme corresponding to the transmitted CQI. Then, scheduling section 210 outputs the information of the subcarrier block allocated to each communication terminal apparatus and MCS to scheduling information generating section 211 and calculating section 1701.

Calculating section 1701 compares the CQI inputted from CQI extracting section 207 with the scheduling information inputted from scheduling section 201, and outputs the comparison result to control section 1702.

Based on the measurement result of the collision inputted from collision measuring section 208 and the comparison result inputted from calculating section 1701, control section 1702 controls the number of subcarrier blocks for which communication terminal apparatus 1600 reports the CQI at next TTI. Then, control section 1702 outputs the information of the controlled number of subcarrier blocks to scheduling information generating section 211.

Scheduling information generating section 211 generates scheduling information including the information of the subcarrier block allocated to each communication terminal apparatus and MCS inputted from scheduling section 210, and the information of the number of subcarrier blocks inputted from control section 1702 and outputs the scheduling information to multiplexing section 212.

The operations of communication terminal apparatus 1600 and base station apparatus 1700 will be described next. In addition, a format of a signaling signal is the same as that in FIG. 4, a format of CQI report control information is the same as that in FIG. 4, and so descriptions thereof will be omitted.

Figure 19:
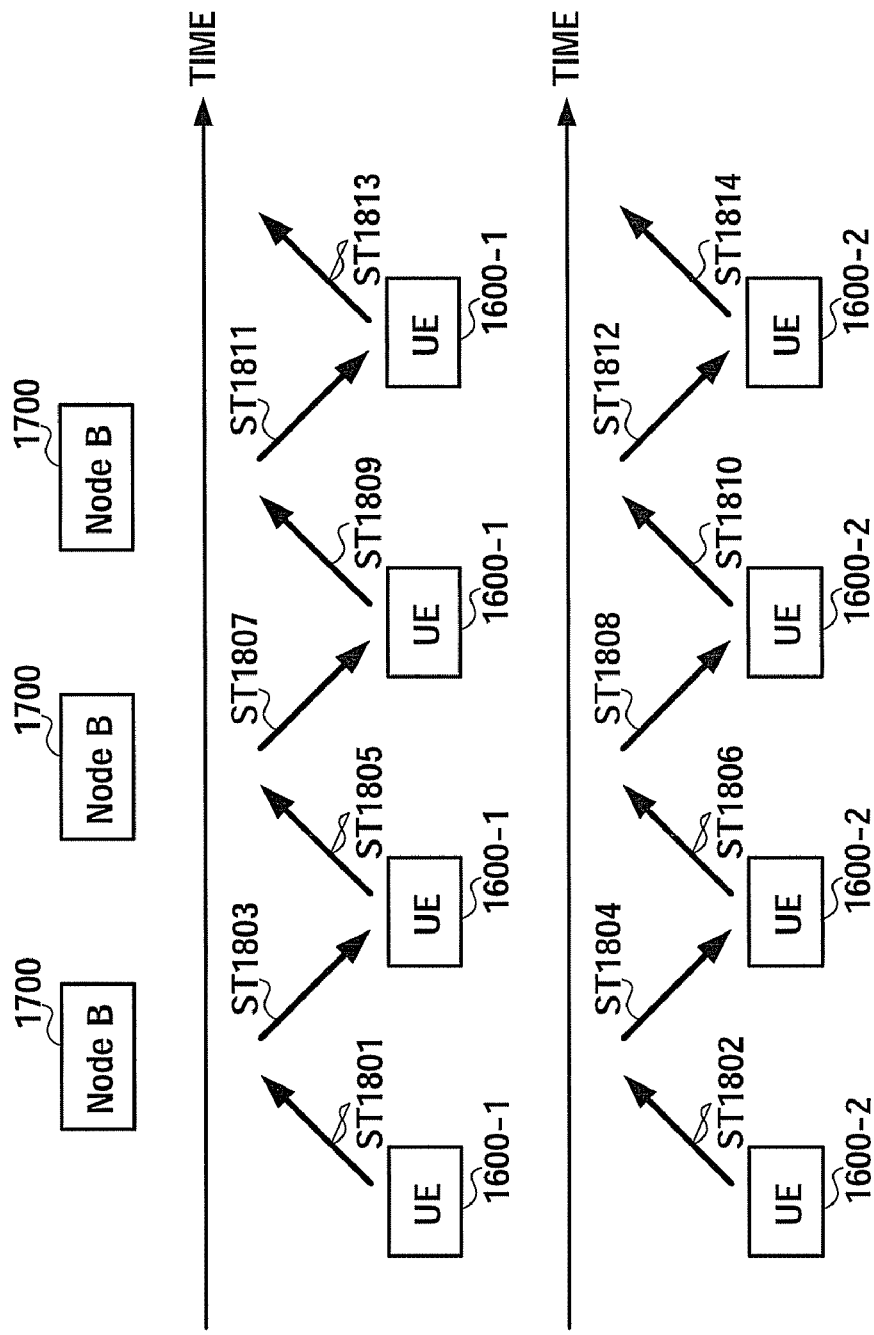
FIG. 19 shows operations of the communication terminal apparatus and the base station apparatus according to Embodiment 5 of the present invention.

FIG. 19 shows the operations of base station apparatus 1700 and communication terminal apparatus 1600. In addition, in FIG. 19, the horizontal axis shows the time, and communication terminal apparatuses 1600-1 and 1600-2 have the same configuration as that of communication terminal apparatus 1600 as shown in FIG. 17. Further, FIG. 19 describes the case where two communication terminal apparatuses 1600 communicate with base station apparatus 1700, but the number of communication terminal apparatuses 1600 may be an arbitrary number.

Communication terminal apparatus 1600 transmits signaling signal 300 of FIG. 4 in uplink, and base station apparatus 1700 transmits CQI report control information 400 of FIG. 5 in downlink. In this way, the processing is finished for an initial report before controlling the number of subcarrier blocks. In addition, the other initial report processing is the same as in above-mentioned Embodiment 1, and so descriptions thereof will be omitted.

The operation for controlling the number of subcarrier blocks to transmit the CQI after the initial report will be described next. First, the operation when the collision does not occur will be described.

By the processing of the initial report, base station apparatus 1700 commands communication terminal apparatuses 1600-1 and 1600-2 to transmit the CQI of at least one subcarrier block in number-of-subcarrier-block #401. In addition, in base station apparatus 1700, the number of CQI designated in number-of-subcarrier-block #401 is not limited to one but may be an arbitrary number.

Each of communication terminal apparatuses 1600-1 and 1600-2 measures the received quality of each subcarrier block in received quality measuring section 110, and generates the CQI in CQI generating section 111. Then, each of communication terminal apparatuses 1600-1 and 1600-2 transmits one CQI of a subcarrier block, for example, with the best received quality among generated pieces of the CQI to base station apparatus 1700 (step ST1801 and step ST1802). In addition, the format of the CQI is the same as in FIG. 8, and so descriptions thereof will be omitted.

Base station apparatus 1700 receiving the CQI does not allocate any subcarrier block to communication terminal apparatuses 1600-1 and 1600-2, as a result of scheduling in scheduling section 210. Accordingly, in base station apparatus 1700, calculating section 1701 outputs such a comparison result that the number of subcarrier blocks for which the CQI has been received is "1" and that the number of actually allocated subcarrier blocks is "0", control section 1702 increases the number of subcarrier blocks to report the CQI by one, and thus, determines that the CQI of two subcarrier blocks is transmitted, and scheduling information generating section 211 generates the scheduling information with the information of the number of subcarrier blocks showing that the number of subcarrier blocks to report the CQI is "2". Accordingly, base station apparatus 1700 transmits the scheduling information including the information that no subcarrier block is allocated and the information of the number of subcarrier blocks showing that the number of subcarrier blocks to report the CQI is "2" (step ST1803 and step ST1804).

Next, each of communication terminal apparatuses 1600-1 and 1600-2 measures the received quality of each subcarrier block in received quality measuring section 110, and generates the CQI in CQI generating section 111. Then, communication terminal apparatuses 1600-1 and 1600-2 transmit a number of pieces of CQI which are designated in the scheduling information, for example, two pieces of CQI of two respective subcarrier blocks with the best and second best received quality among generated pieces of CQI to base station apparatus 1700 (step ST1805 and step ST1806). The format of the CQI is the same as in FIG. 8, and so descriptions thereof will be omitted.

Next, base station apparatus 1700 receiving the CQI does not allocate any subcarrier block to communication terminal apparatuses 1600-1 and 1600-2, as a result of scheduling in scheduling section 210. Accordingly, in base station apparatus 1700, calculating section 1701 outputs such a comparison result that the number of subcarrier blocks for which the CQI has been received is "2" and that the number of actually allocated subcarrier blocks is "0", control section 1702 further increases the number of subcarrier blocks to report the CQI by one, and thus, determines that the CQI of three subcarrier blocks is transmitted, and scheduling information generating section 211 includes the information of the number of subcarrier blocks showing that the number of subcarrier blocks to report the CQI is "3" in the scheduling information. Accordingly, base station apparatus 1700 transmits the scheduling information including the information that no subcarrier block is allocated and the information of the number of subcarrier blocks showing that the number of subcarrier blocks to report the CQI is "3" (step ST1807 and step ST1808).

Next, each of communication terminal apparatuses 1600-1 and 1600-2 measures the received quality of each subcarrier block in received quality measuring section 110, and generates the CQI in CQI generating section 111. Then, communication terminal apparatuses 1600-1 and 1600-2 transmit a number of pieces of CQI which are designated in the scheduling information, for example, three pieces of CQI of three respective subcarrier blocks with the best, second best and third best received quality among generated pieces of CQI to base station apparatus 1700 (step ST1809 and step ST1810).

Next, base station apparatus 1700 receiving the CQI allocates one subcarrier block to each of communication terminal apparatuses 1600-1 and 1600-2, as a result of scheduling in scheduling section 210. Accordingly, in base station apparatus 1700, calculating section 1701 outputs such a comparison result that the number of subcarrier blocks for which the CQI has been received is "3" and that the number of actually allocated subcarrier blocks is "1", control section 1702 decreases the number of subcarrier blocks to report the CQI by one, and thus, determines that the CQI of two subcarrier blocks is transmitted, and scheduling information generating section 211 includes the information of the number of subcarrier blocks showing that the number of subcarrier blocks to report the CQI is "2" in the scheduling information. Accordingly, base station apparatus 1700 transmits the scheduling information including the information that one subcarrier block is allocated and the information of the number of subcarrier blocks showing that the number of subcarrier blocks to report the CQI is "2" (step ST1811 and step ST1812).

Next, each of communication terminal apparatuses 1600-1 and 1600-2 measures the received quality of each subcarrier block in received quality measuring section 110, and generates the CQI in CQI generating section 111. Then, communication terminal apparatuses 1600-1 and 1600-2 transmit a number of pieces of CQI which are designated in the scheduling information, for example, two pieces of CQI of two respective subcarrier blocks with the best and second best received quality among generated pieces of CQI to base station apparatus 1700 (step ST1813 and step ST1814). Thereafter, communication terminal apparatuses 1600-1 and 1600-2 and base station apparatus 1700 can adaptively control the number of subcarrier blocks to transmit the CQI by repeating the similar processing. In addition, the number of subcarrier blocks to increase and the number of subcarrier blocks to decrease are not limited to one, and it is possible to increase or decrease subcarrier blocks by an arbitrary number. Further, the number of subcarrier blocks to increase/decrease may be changed.

Next, the operation when the collision occurs will be described next with reference to FIG. 19. For example, when the CQI reported in step ST1809 and step ST1810 overlaps with each other in one subcarrier block, base station apparatus 1700 detects that the collision with the number of collisions of "1" occurs in collision measuring section 208. Then, base station apparatus 1700 determines to increase the number of subcarrier blocks to report the CQI by one in control section 1702. Next, base station apparatus 1700 increases the number of subcarrier blocks by one and transmits the scheduling information including the information of the number of subcarrier blocks that the number of subcarrier blocks is "4". Then, communication terminal apparatuses 1600-1 and 1600-2 extract the scheduling information in scheduling information extracting section 107, and output four pieces of CQI in sort section 112. By this means, each of communication terminal apparatuses 1600-1 and 1600-2 transmits four pieces of CQI to base station apparatus 1700 (step ST1809 and step ST1810). Herein, when controlling the number of subcarrier blocks to report the CQI, control section 1702 of base station apparatus 1700 controls the number of subcarrier blocks to report the CQI, further considering the result of comparison between the number of subcarrier blocks for which the CQI has been received and the number of allocated subcarrier blocks in comparing circuit 800, in addition to the number of collisions. In addition, base station apparatus 1700 may consider one of the number of collisions and the comparison result in comparing circuit 800, in addition to considering both the number of collisions and the comparison result in comparing circuit 800. Further, the number of subcarrier blocks to increase and the number of subcarrier blocks to decrease are not limited to one, and it is possible to increase or decrease subcarrier blocks by an arbitrary number. Furthermore, the number of subcarrier blocks to increase/decrease may be changed.

Thus, according to Embodiment 5, based on a result of comparison between the number of subcarrier blocks for which the communication terminal apparatus has reported the CQI and the number of actually allocated subcarrier blocks, or based on the collision information, the number of subcarrier blocks for which the communication terminal apparatus reports the CQI is controlled, so that it is possible to reduce the interference in uplink without wasting reports of received quality, perform optimal allocation by scheduling, prevent resources from being lost, and maintain fairness of transmission allocation by scheduling.

In addition, in above-mentioned Embodiments 2 to 4, when control section 1702 in the base station apparatus controls the number of subcarrier blocks to transmit the CQI, Embodiment 5 is applicable to above-mentioned Embodiments 2 to 4.

Embodiment 6

Figure 20:
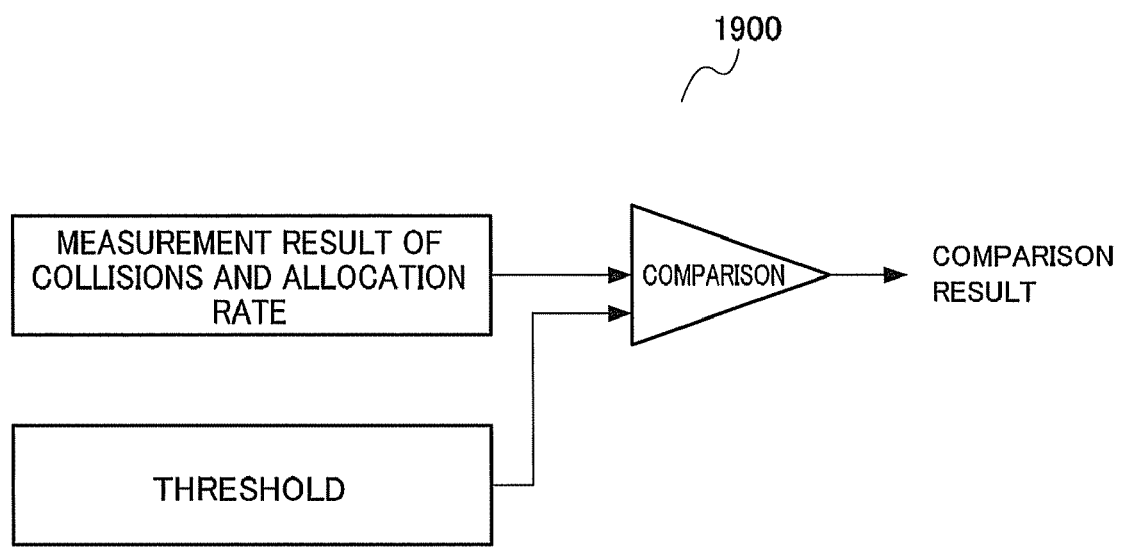
FIG. 20 shows a comparing circuit according to Embodiment 6 of the present invention.

FIG. 20 shows comparing circuit 1900 according to Embodiment 6 of the present invention. In addition, in Embodiment 6, a configuration of a communication terminal apparatus is the same as that in FIG. 17, a configuration of a base station apparatus is the same as that in FIG. 18, and so descriptions thereof will be omitted.

In base station apparatus 1700, control section 113 compares collisions and an allocation rate that is a ratio of the number of subcarrier blocks actually allocated by scheduling to the number of subcarrier blocks of received CQI with thresholds, using comparing circuit 1900 as shown in FIG. 20. Based on a result of the comparison, control section 113 increases the number of subcarrier blocks to report the CQI when the collisions or the allocation rate is smaller than the threshold, and decreases the number of subcarrier blocks to report the CQI when the collisions or the allocation rate is equal to or greater than the threshold. In addition, operations of the communication terminal apparatus and the base station apparatus are the same as in above-mentioned Embodiment 5, and so descriptions thereof will be omitted.

FIG. 21 shows circumstances of collisions of subcarrier blocks for which communication terminal apparatuses transmit the CQI measured in the base station apparatus. In FIG. 21, the same numeric value in report time (A) shows the same time. Further, report subcarrier block number (B) is a subcarrier block number that each communication terminal apparatus reports to the base station apparatus, and shows that there are eight subcarrier blocks from number 1 to number 8 in total in the case of FIG. 21. Furthermore, the number of CQI reports (C) of an arbitrary subcarrier block is the number that the CQI is reported in a single subcarrier block selected arbitrarily. In addition, collision factor (D) of an arbitrary subcarrier block is the same numeric value as that of (C). Further, distribution (E) of UE reports shows distribution circumstances of each subcarrier block for which a plurality of communication terminal apparatuses report at the same time. Furthermore, the number of all UEs (F) shows the number of communication terminal apparatuses existing in the cell, and in the case of FIG. 21, the number of communication terminal apparatuses is "16". UE based cumulative/instantaneous allocation rate (G) is cumulative allocation rate/instantaneous allocation rate of each communication terminal apparatus. UE based desired/actual bit rate (H) is desired bit rate/actually assigned bit rate of each communication terminal apparatus. UE based report frequency range (I) is the frequency range in which each communication terminal apparatus reports the CQI.

Control section 1702 of base station apparatus 1700 compares (D) with a threshold in comparing circuit 1900, and controls to increase the number of subcarrier blocks to report the CQI when (D) is smaller than the threshold, and controls to decrease the number of subcarrier blocks to report the CQI when (D) is equal to or greater than the threshold.

Thus, according to Embodiment 6, based on the allocation rate or the collision information, the number of subcarrier blocks for which the communication terminal apparatus reports the CQI is controlled, so that it is possible to reduce the interference in uplink without wasting reports of received quality, perform optimal allocation by scheduling, prevent resources from being lost, and maintain fairness of transmission allocation by scheduling.

Embodiment 7

Figure 22:
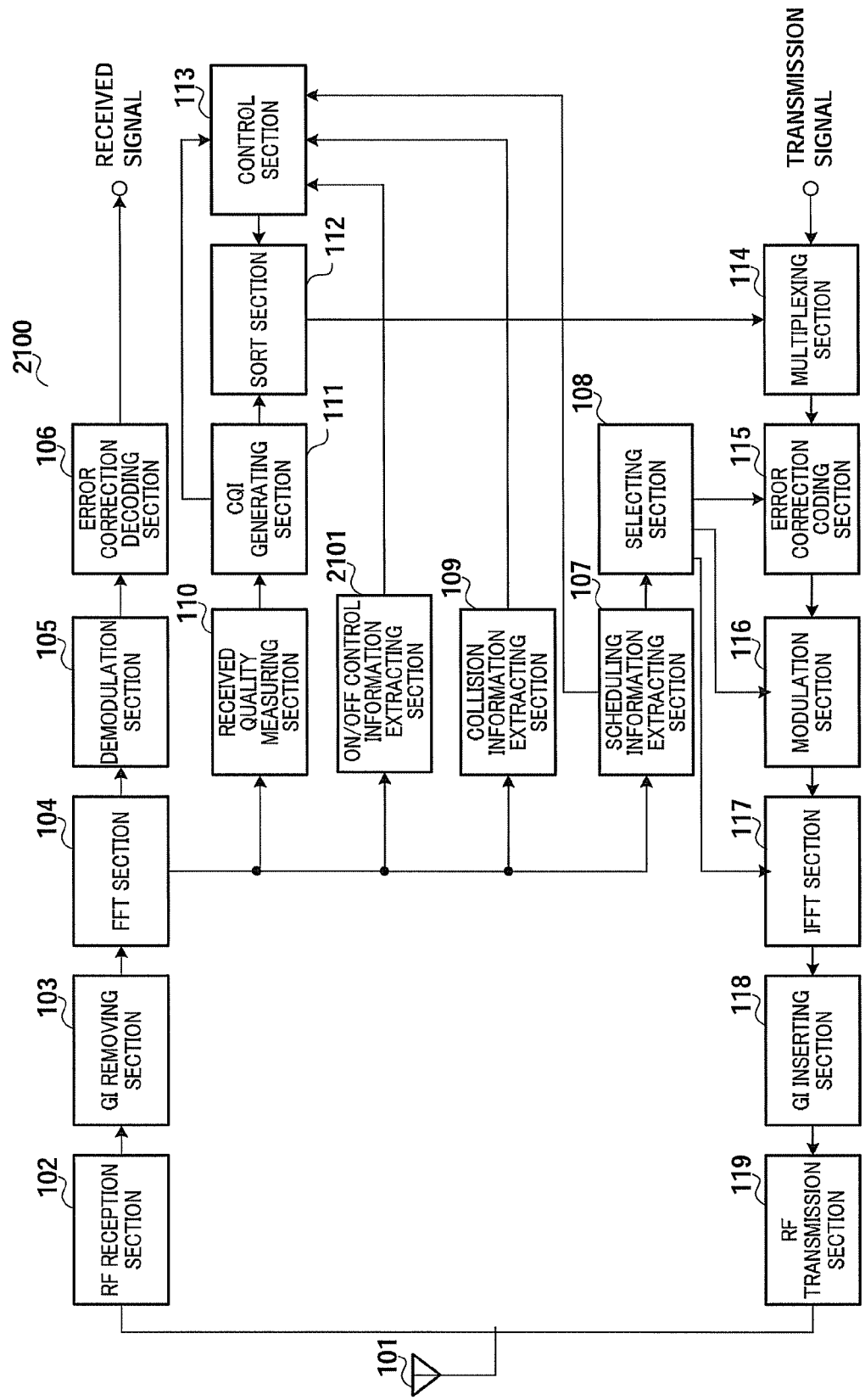
FIG. 22 is a block diagram showing a configuration of a communication terminal apparatus according to Embodiment 7 of the present invention.

FIG. 22 is a block diagram showing a configuration of communication terminal apparatus 2100 according to Embodiment 7 of the present invention.

As shown in FIG. 22, communication terminal apparatus 2100 according to Embodiment 7 is further provided with ON/OFF control information extracting section 2101 in communication terminal apparatus 100 according to Embodiment 1 as shown in FIG. 2. In addition, in FIG. 22, the same components as those in FIG. 2 will be assigned the same reference numerals, and so descriptions thereof will be omitted.

FFT section 104 performs FFT on a received signal inputted from GI removing section 103 and outputs the result to demodulation section 105, scheduling information extracting section 107, collision information extracting section 109, received quality measuring section 110 and ON/OFF control information extracting section 2101.

ON/OFF control information extracting section 2101 extracts ON/OFF control information that is information to switch between transmission and non-transmission of CQI from the received signal inputted from FFT section 104 and outputs the ON/OFF control information to control section 103.

Control section 113 designates the number of subcarrier blocks to output the CQI, to sort section 112, based on the information of the number of subcarrier blocks for which the CQI has been transmitted and which is inputted from CQI generating section 111, the collision information inputted from collision information extracting section 109, and the scheduling information inputted from scheduling information extracting section 107. Further, when the ON/OFF control information to stop the transmission of CQI is inputted from ON/OFF control information extracting section 2101, control section 113 commands sort section 112 to stop the output of CQI of the designated number of subcarrier blocks. Furthermore, when the ON/OFF control information to resume the transmission of CQI is inputted from ON/OFF control information extracting section 2101, control section 113 commands sort section 112 to resume the output of CQI of the designated number of subcarrier blocks.

Figure 23:
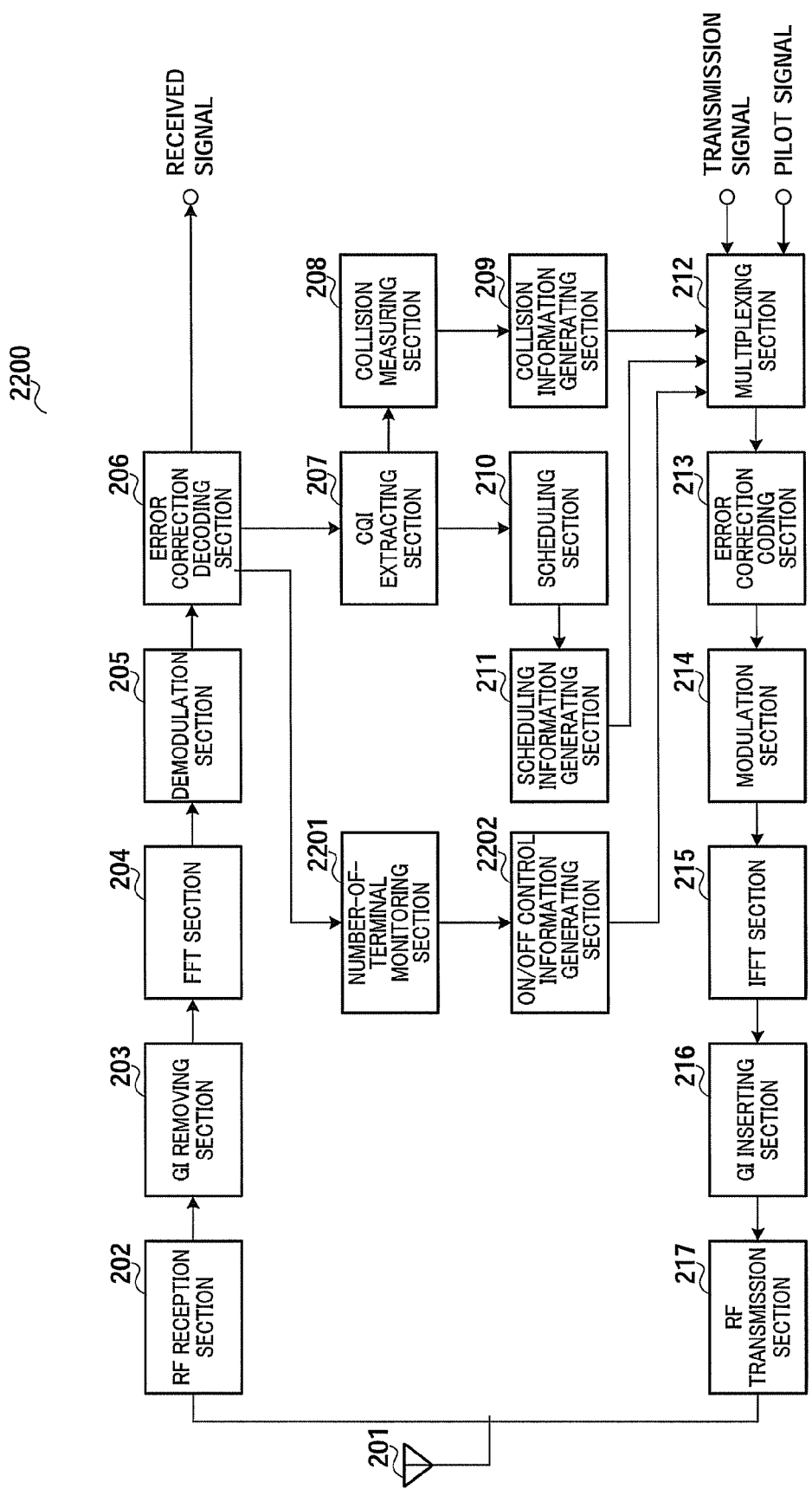
FIG. 23 is a block diagram showing a configuration of a base station apparatus according to Embodiment 7 of the present invention.

A configuration of base station apparatus 2200 will be described with reference to FIG. 23. FIG. 23 is a block diagram showing the configuration of base station apparatus 2200.

As shown in FIG. 23, base station apparatus 2200 according to Embodiment 7 is further provided with number-of-terminal monitoring section 2201 and ON/OFF control information generating section 2202 in base station apparatus 200 according to Embodiment 1 as shown in FIG. 3. In addition, in FIG. 23, the same components as those in FIG. 3 will be assigned the same reference numerals, and descriptions thereof will be omitted.

Error correction decoding section 206 performs error correction decoding on a received signal inputted from demodulation section 205 and outputs the result to CQI extracting section 207 and number-of-terminal monitoring section 2201, and outputs the result as a received signal.

Number-of-terminal monitoring section 2201 counts the number of communication terminal apparatuses 2100 currently communicating, at a predetermined timing, from the received signal inputted from error correction decoding section 206. Then, when detecting that the counted number of communication terminal apparatuses 2100 turns from the number smaller than a threshold to the number equal to or larger than the threshold, number-of-terminal monitoring section 2201 outputs information that the number of communication terminal apparatuses 2100 is equal to or larger than the threshold to ON/OFF control information generating section 2202. Further, when detecting that the counted number of communication terminal apparatuses 2100 turns from the number equal to or larger than the threshold to the number smaller than the threshold, number-of-terminal monitoring section 2201 outputs information that the number of communication terminal apparatuses 2100 is smaller than the threshold to ON/OFF control information generating section 2202.

When the information that the number of communication terminal apparatuses 2100 becomes equal to or larger than the threshold is inputted from number-of-terminal monitoring section 2201, ON/OFF control information generating section 2202 generates the ON/OFF control information to stop the transmission of CQI and outputs the ON/OFF control information to multiplexing section 212. Meanwhile, when the information that the number of communication terminal apparatuses 2100 becomes smaller than the threshold is inputted from number-of-terminal monitoring section 2201, ON/OFF control information generating section 2202 generates the ON/OFF control information to resume the transmission of CQI and outputs the ON/OFF control information to multiplexing section 212.

Multiplexing section 212 multiplexes the transmission signal, pilot signal, collision information inputted from collision information generating section 209, scheduling information inputted from scheduling information generating section 211 and ON/OFF control information inputted from ON/OFF control information generating section 2202, generates a multiplexed signal, and outputs the generated multiplexed signal to error correction coding section 213.

Figure 24:
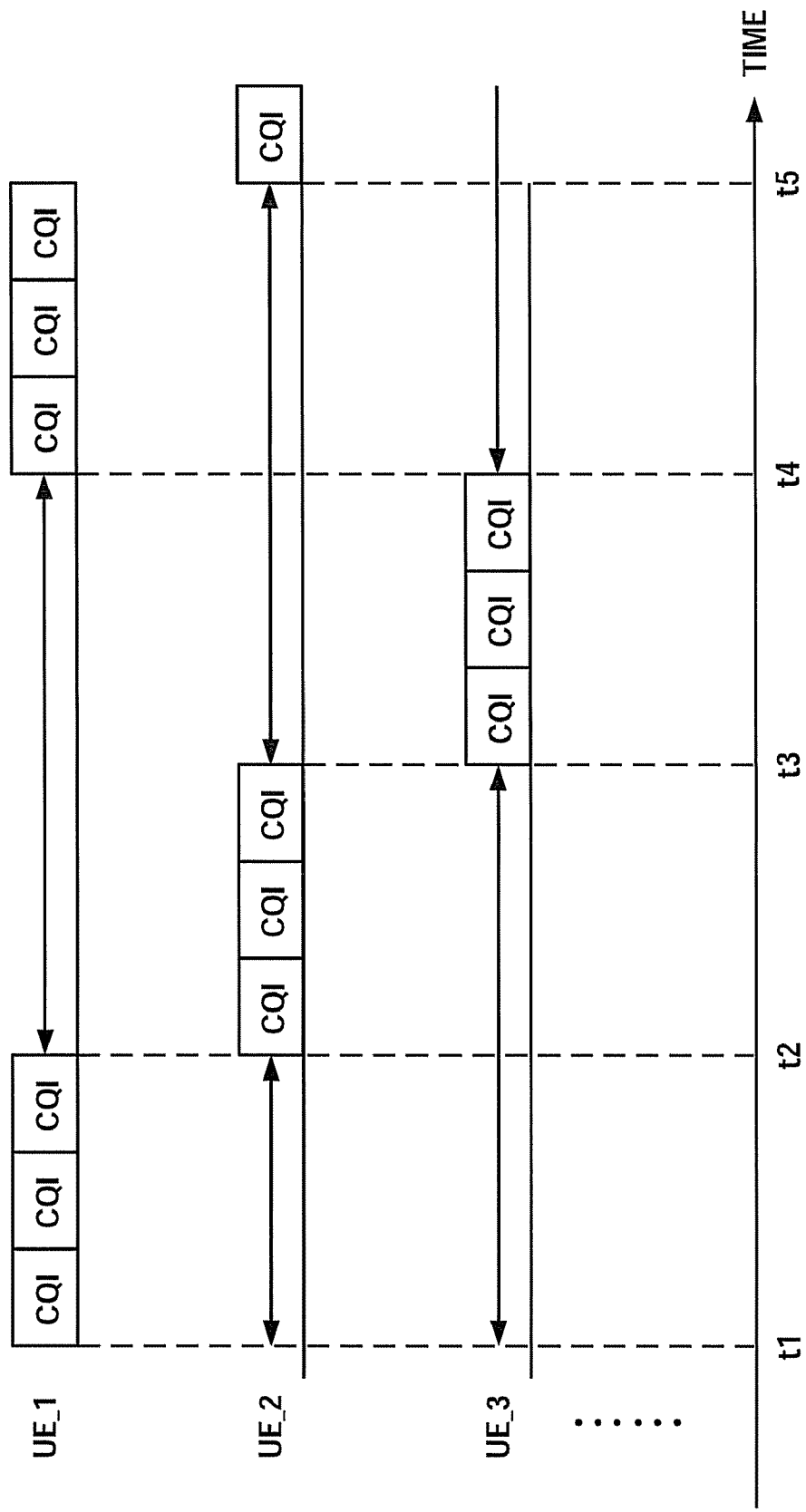
FIG. 24 shows CQI transmission timing of each communication terminal apparatus according to Embodiment 7 of the present invention.

Operations of communication terminal apparatus 2100 and base station apparatus 2200 will be described next with reference to FIG. 24. FIG. 24 shows a CQI transmission timing of each communication terminal apparatus. In addition, communication terminal apparatuses 2100 (UE1 to UE3) are communicating with the same base station apparatus 2200.

In base station apparatus 2200, when number-of-terminal monitoring section 2201 detects that the number of communication terminal apparatuses in communication turns from the number smaller than the threshold to the number equal to or larger than the threshold, ON/OFF control information generating section 2202 generates the ON/OFF control information to stop the transmission of CQI of communication terminal apparatus 2100 (UE2) and communication terminal apparatus 2100 (UE3) at time t1. Then, base station apparatus 2200 transmits the ON/OFF control information. In communication terminal apparatus 2100 (UE2) and communication terminal apparatus 2100 (UE3) receiving the ON/OFF control information, ON/OFF control information extracting section 2101 extracts the ON/OFF control information, and control section 113 commands sort section 112 to stop the output of CQI from time t1. By this means, communication terminal apparatus 2100 (UE2) and communication terminal apparatus 2100 (UE3) stop the transmission of CQI from time t1. Meanwhile, communication terminal apparatus 2100 (UE1) is not commanded to stop the transmission of CQI by the ON/OFF control information, and so continues the transmission of CQI.

Subsequently, ON/OFF control information generating section 2202 generates the ON/OFF control information to stop the transmission of CQI of communication terminal apparatus 2100 (UE1), and generates the ON/OFF control information to resume the transmission of CQI of communication terminal apparatus 2100 (UE2) at time t2. Then, base station apparatus 2200 transmits the ON/OFF control information. In communication terminal apparatus 2100 (UE1) and communication terminal apparatus 2100 (UE2) receiving the ON/OFF control information, ON/OFF control information extracting section 2101 extracts the ON/OFF control information. Then, in communication terminal apparatus 2100 (UE1), control section 113 commands sort section 112 to stop the output of CQI from time t2. Meanwhile, in communication terminal apparatus 2100 (UE2) control section 113 commands sort section 112 to resume the output of CQI from time t2. By this means, at time t2, communication terminal apparatus 2100 (UE1) stops the transmission of CQI, and communication terminal apparatus 2100 (UE1) resumes the transmission of CQI. Meanwhile, communication terminal apparatus 2100 (UE3) is not commanded to resume the transmission of CQI by the ON/OFF control information, and so continues to stop the transmission of CQI. Thereafter, at time t3, t4 and t5, similar operations are carried out.

Thus, according to Embodiment 7, in addition to the effect of above-mentioned Embodiment 1, when the number of communication terminal apparatuses is large, the transmission of CQI from a predetermined number of communication terminal apparatuses is made to stop, so that it is possible to increase the probability of allocating transmission to the communication terminal apparatus that has transmitted the CQI.

In addition, in Embodiment 7, the ON/OFF control information is generated based on the number of communication terminal apparatuses with which the base station apparatus is communicating, but the present invention is not limited thereto. The ON/OFF control information may be generated based on the traffic status within the cell, the collision status of a subcarrier block for which the CQI is transmitted among communication terminal apparatuses, the allocation rate or the like.

In above-mentioned Embodiments 1 to 7, in the communication terminal apparatus, sort section 112 rearranges the CQI, but the present invention is not limited thereto. Sort section 112 may be removed and the CQI may be outputted to multiplexing section 114 from CQI generating section 111 without being rearranged. In this case, CQI generating section 111 may output the CQI in descending order of the received quality among an arbitrary sequence of the CQI, or may output the CQI selected arbitrarily irrespective of the received quality. Further, in above-mentioned Embodiments 1 to 7, the number of subcarrier blocks to transmit the CQI may be controlled based on a result of comparison between QoS requested from the communication terminal apparatus and QoS of a result of allocation of resources in the base station apparatus. In this case, when QoS requested by the communication terminal apparatus is satisfied, the number of subcarrier blocks is decreased, and, when QoS requested by the communication terminal is not satisfied, the number of subcarrier blocks is increased. Furthermore, in above-mentioned Embodiments 1 to 7, the communication terminal apparatus reports the received quality using the CQI, but the present invention is not limited thereto. The communication terminal apparatus may report the received quality using arbitrary means other than the CQI.

Moreover, in above-mentioned Embodiments 1 to 7, the base station apparatus commands the communication terminal apparatus using CQI report control information 400 in initial reporting, based on signaling signal 300 transmitted from the communication terminal apparatus, but the present invention is not limited thereto. The base station apparatus may command the communication terminal apparatus using CQI report control information 400 also after the initial reporting, based on signaling signal 300. In this case, the base station apparatus directly designates a cycle, time offset, and frequency range for reporting the CQI to communication terminal apparatuses, and disperses the CQI transmitted from the communication terminal apparatuses in domains of time, frequency and the like, so that it is possible to improve CQI report efficiency in uplink and reduce the interference in uplink. Further, when the number of communication terminal apparatuses within the cell is large, the base station apparatus divides the entire bandwidth into a plurality of portions, divides the communication terminal apparatuses into a plurality of groups and assigns communication terminal apparatuses of different groups to different frequency ranges in advance, so that it is possible to reduce collisions in CQI transmission of the communication terminal apparatuses.

INDUSTRIAL APPLICABILITY

The communication terminal apparatus, base station apparatus and received quality reporting method according to the present invention are suitable particularly for reporting the received quality in uplink in multicarrier transmission schemes.

The invention claimed is:

1. A communication terminal apparatus comprising:
   a reporting unit that is configured to report a channel quality indicator (CQI) to a base station;
   a counting unit that is configured to count a number of times the reporting unit has reported the CQI;
   a receiving unit that is configured to receive allocation information from the base station;
   an accumulating unit that is configured to accumulate a number of subcarrier blocks that have been allocated to the communication terminal by the base station;
   a calculating unit that is configured to calculate a cumulative allocation rate based on the counted number of times and the accumulated number of subcarrier blocks; and
   a controlling unit that is configured to increase a number of subcarrier blocks for which the CQI is to be reported when the calculated cumulative allocation rate is lower than a threshold, and to decrease the number of subcarrier blocks for which the CQI is to be reported when the calculated cumulative allocation rate is higher than the threshold.

2. A communication method comprising:
   reporting a channel quality indicator (CQI) to a base station;
   counting a number of times the CQI has been reported;
   receiving allocation information from the base station;
   accumulating a number of subcarrier blocks that have been allocated to the communication terminal by the base station;

calculating a cumulative allocation rate based on the counted number of times and the accumulated number of subcarrier blocks; and controlling a number of subcarrier blocks far which the CQI is to be reported, by increasing the number of subcarrier blocks for which the CQI is to be reported when the calculated cumulative allocation rate is lower than a threshold, and by decreasing the number of subcarrier blocks for which the CQI is to be reported when the calculated cumulative allocation rate is higher than the threshold.

* * * * *